United States Patent
Egoshi

[19]

[11] Patent Number: 6,163,526

[45] Date of Patent: Dec. 19, 2000

[54] TRANSMISSION SYSTEM FOR SWITCHING CONNECTION FROM A WORKING CHANNEL LINE TO A PROTECTION CHANNEL LINE WHILE AVOIDING INSTANTANEOUS CUTOFF UPON FAILURE

[75] Inventor: Hiroya Egoshi, Kawasaki, Japan

[73] Assignee: Fujitsu Limited, Kawasaki, Japan

[21] Appl. No.: 09/055,568

[22] Filed: Apr. 6, 1998

[30] Foreign Application Priority Data

Oct. 8, 1997 [JP] Japan ................................. 9-276133

[51] Int. Cl.[7] .................................................. G06F 11/20
[52] U.S. Cl. ......................................................... 370/228
[58] Field of Search ................................... 370/225, 226, 370/227, 228, 216, 217, 221, 222, 223, 224, 535, 539, 541; 714/1, 2

[56] References Cited

U.S. PATENT DOCUMENTS

| | | | |
|---|---|---|---|
| 5,537,393 | 7/1996 | Shioda et al. | 370/223 |
| 5,631,896 | 5/1997 | Kawase et al. | 370/228 |
| 5,923,653 | 7/1999 | Denton | 370/375 |
| 5,978,354 | 11/1999 | Taketomi et al. | 370/226 |
| 6,049,523 | 4/2000 | Anderson et al. | 370/217 |

*Primary Examiner*—Ajit Patel
*Assistant Examiner*—Saba Tsegaye
*Attorney, Agent, or Firm*—Helfgott & Karas, P.C.

[57] ABSTRACT

A transmission system for transmitting data of a synchronous digital hierarchy SDH frame includes a transmission terminal, a transport terminal and a reception terminal linked together by a working channel line and a protection channel line in a redundant structure. Each of the transmission terminal and the transport terminal includes an alarm indication insertion unit which inserts an alarm indication in the SDH frame, the alarm indication indicating whether a related channel line has failed. The SDH frame containing the alarm indication is transmitted to the reception terminal prior to transmission of the data on the related channel line. The reception terminal includes a control unit which outputs a selected one of the SDH frame on the working channel line and the SDH frame on the protection channel line in response to the alarm indication received by the control unit. When one of the working channel line and the protection channel line has failed, the control unit switches a connection from one of the working channel line and the protection channel line to the other without causing instantaneous cutoff.

10 Claims, 24 Drawing Sheets

FIG. 19

| SF BYTE FROM PRT CH | H | L | H | L |
|---|---|---|---|---|
| SF BYTE FROM WRK CH | L | H | H | L |
| OUTPUT SIGNAL | L | H | × | × |

× : PREVIOUS STATE RETAINED

TRANSMISSION SYSTEM FOR SWITCHING CONNECTION FROM A WORKING CHANNEL LINE TO A PROTECTION CHANNEL LINE WHILE AVOIDING INSTANTANEOUS CUTOFF UPON FAILURE

BACKGROUND OF THE INVENTION (1) Field of the Invention

The present invention relates to a transmission system having a plurality of terminals linked by a working channel line and a protection channel line in a redundant structure wherein a connection is switched from the working channel line to the protection channel line while avoiding instantaneous cutoff when the working channel line has failed.

It is desired to provide reliable data communication in a transmission system having a plurality of terminals linked by a working channel line and a protection channel line in a redundant structure. In order to attain this objective, it is necessary that the transmission system reliably switch a connection from the working channel line to the protection channel line while avoiding instantaneous cutoff when one of the two channel lines has failed.

(2) Description of the Related Art

FIG. 22 shows a conventional transmission system having a plurality of terminals linked by a working channel line and a protection channel line in a redundant structure. In the conventional transmission system, a connection is switched from the working channel line to the protection channel line while avoiding instantaneous cutoff when a switching command to switch one of the channel lines to the other is received.

As shown in FIG. 22, the conventional transmission system includes a transmission terminal 101 (which is called a terminal A), a reception terminal 103 (which is called a terminal B), and a transport terminal 102 (which is called a terminal C). The terminal A and the terminal B are linked by a working channel line, and the terminal A, the terminal C and the terminal B are linked by a protection channel line. In the conventional transmission system of FIG. 22, transmission of a digital signal in the existing synchronous digital hierarchy (SDH) frame format is assumed.

In the transmission terminal 101 (the terminal A), a frame pulse insertion unit (FP INS) 104 and a distribution unit (DIS) 105 are provided. The FP INS 104 inputs the SDH frame and inserts a frame pulse (FP) in the SDH frame at a given location of the SDH frame. The frame pulse (FP) inserted by the FP INS 104 indicates a reference position in the SDH frame on the related channel line. When a switching command is externally supplied to the reception terminal 103, the FP in the SDH frame is used by the reception terminal 103 to synchronize the SDH frame on the working channel line with the SDH frame on the protection channel line.

The DIS 105 supplies the SDH frame (with the FP inserted) from the FP INS 104 to both the terminal B through the working channel line and the terminal C through the protection channel line.

In the transport terminal 102 (the terminal C), a data delay unit 106 is provided. The data delay unit 106 provides a delay for the SDH frame on the protection channel line from the terminal A.

In the reception terminal 103 (the terminal B), a fixed delay unit 107, a frame pulse detection unit (FP DET) 108, and a control unit 109 are provided. The fixed delay unit 107 provides a fixed delay for the SDH frame on the working channel line from the terminal A. The fixed delay is provided by the fixed delay unit 107 such that a total delay for the SDH frame on the working channel line due to the transmission between the terminal A and the terminal B and due to the transmission through the fixed delay unit 107 within the terminal B is always greater than a delay for the SDH frame on the protection channel line due to the transmission between the terminals A, C and B and due to the transmission through the data delay unit 106 within the terminal C.

The frame pulse detection unit (FP DET) 108 detects the frame pulse (FP) in the SDH frame on the working channel line, and separates the frame pulse (FP) from the SDH frame on the working channel line. The FP DET 108 supplies the frame pulse to the control unit 109 and outputs the reconstructed SDH frame (with no frame pulse) which is the same as the SDH frame originally sent on the working channel line from the terminal A.

Further, in the reception terminal 103, a data delay unit 110, a frame pulse detection unit (FP DET) 111, and a selector 112 are provided. The data delay unit 110 provides a variable delay for the SDH frame on the protection channel line from the terminal C. The delay provided for the SDH frame on the protection channel line by the data delay unit 110 is controlled by the control unit 109 such that a position of the FP in the SDH frame on the protection channel line matches with a position of the FP in the SDH frame on the working channel line.

The frame pulse detection unit (FP DET) 111 detects the frame pulse (FP) in the SDH frame on the protection channel line, and separates the frame pulse (FP) from the SDH frame on the protection channel line. The FP DET 111 supplies the frame pulse (FP) to the control unit 109 and outputs the reconstructed SDH frame (with no frame pulse) which is the same as the SDH frame originally sent on the protection channel line from the terminal A.

The control unit 109 receives the frame pulse (FP) from the FP DET 108 and the frame pulse (FP) from the FP DET 111, and controls the variable delay of the data delay unit 110 based on the FP from the FP DET 108 such that a position of the FP in the SDH frame on the protection channel line matches with a position of the FP in the SDH frame on the working channel line. Further, the control unit 109 controls the selector 112 in response to an externally supplied switching command, so that the selector 112 outputs a selected one of the SDH frame on the working channel line from the FP DET 108 and the SDH frame on the protection channel line from the FP DET 111.

The selector 112 outputs the selected one of the SDH frame on the working channel line from the FP DET 108 and the SDH frame on the protection channel line from the FP DET 111, under the control of the control unit 109, as the output data from the terminal B.

FIG. 23 shows an operation of the conventional transmission system of FIG. 22.

In the above-described conventional system, when a digital signal in the SDH frame format is input to the transmission terminal 101, the frame pulse insertion unit 104 inserts a frame pulse (FP) in the SDH frame. The SDH frame with the FP inserted is produced at the output of the FP INS 104.

The distribution unit 105 outputs the SDH frame (with the FP inserted) to both the reception terminal B through the working channel line and the transport terminal C through the protection channel line ("S1" in FIG. 23).

A first delay due to the transmission of the digital signal on the working channel line is provided for the SDH frame having the FP on the working channel line. The delayed SDH frame is input to the fixed delay unit 107 in the terminal B ("S2" in FIG. 23).

A second delay due to the transmission of the digital signal on the protection channel line and through the data delay unit 106 of the terminal C is provided for the SDH frame having the FP on the protection channel line. The delayed SDH frame is input to the data delay unit 110 in the terminal B ("S3" in FIG. 23).

A third delay is further provided for the SDH frame having the FP on the working channel line by the fixed delay unit 107 in the terminal B. The delayed SDH frame is output from the fixed delay unit 107 ("S4" in FIG. 23).

The third delay (or the fixed delay) is provided by the fixed delay unit 107 such that a total delay (the first delay plus the third delay) for the SDH frame on the working channel line input to the FP DET 108 is always greater than the second delay for the SDH frame on the protection channel line input to the FP DET 111.

The control unit 109 controls the variable delay of the data delay unit 110 based on the FP from the FP DET 108 such that a position of the FP in the SDH frame on the protection channel line matches with a position of the FP in the SDH frame on the working channel line. Further, the control unit 109 controls the selector 112 in response to an externally supplied switching command, so that the selector 112 outputs a selected one of the SDH frame on the working channel line from the FP DET 108 and the SDH frame on the protection channel line from the FP DET 111. The selector 112 normally outputs the SDH frame on the working channel line from the FP DET 108. When the switching command to switch the working channel line to the protection channel line is externally supplied to the control unit 109, the selector 112 outputs the SDH frame on the protection channel line from the FP DET 111.

Accordingly, when both the working channel line and the protection channel line normally function and a switching command to switch one of the channel lines to the other is externally supplied, the conventional transmission system of FIG. 22 can switch a connection from the working channel line to the protection channel line without causing instantaneous cutoff in response to the command. However, when the working channel line has failed, the switching command cannot be supplied to the control unit 109 in the reception terminal 103. Therefore, when the working channel line has failed, it is impossible for the conventional transmission system of FIG. 22 to switch a connection from the working channel line to the protection channel line while avoiding instantaneous cutoff. It is difficult for the conventional transmission system of FIG. 22 to provide reliability for data communication if the working channel line has failed.

SUMMARY OF THE INVENTION

An object of the present invention is to provide an improved transmission system in which the above-mentioned problems are eliminated.

Another object of the present invention is to provide a transmission system which can reliably switch a connection from the working channel line to the protection channel line while avoiding instantaneous cutoff even when the working channel line has failed, in order to provide increased reliability for data communication in the transmission system.

The above-mentioned objects of the present invention are achieved by a transmission system for transmitting data of a synchronous digital hierarchy SDH frame, wherein the transmission system includes a plurality of terminals linked by a working channel line and a protection channel line in a redundant structure, the transmission system comprising: a transmission terminal; a transport terminal linked with the transmission terminal by one of the working channel line and the protection channel line; and a reception terminal linked with the transmission terminal by the working channel line and the protection channel line via the transport terminal, each of the transmission terminal and the transport terminal comprising an alarm indication insertion unit which inserts an alarm indication in the SDH frame at a given location of the SDH frame, the alarm indication indicating whether a related channel line has failed, the SDH frame containing the alarm indication being transmitted to the reception terminal prior to transmission of the data on the related channel line, the reception terminal comprising a control unit which outputs a selected one of the SDH frame on the working channel line and the SDH frame on the protection channel line in response to the alarm indication received by the control unit, wherein, when one of the working channel line and the protection channel line has failed, the control unit switches a connection from one of the working channel line and the protection channel line to the other while avoiding instantaneous cutoff.

In the transmission system of the present invention, when one of the working and protection channel lines within the transmission system has failed, the alarm indication insertion unit inserts an alarm indication in the SDH frame at a given location of the SDH frame, the alarm indication indicating the failure of the related channel line. In the transport terminal, the data of the SDH frame is delayed but the alarm indication is transmitted to the reception terminal without delay. The SDH frame containing the alarm indication is transmitted from a position of the failure to the reception terminal prior to transmission of the data on the related channel line. In the reception terminal, the control unit automatically switches a connection from one of the working and protection channel lines to the other while avoiding instantaneous cutoff in response to the alarm indication received by the control unit. The switching procedure is performed by the reception terminal within a period of time from the occurrence of the failure to the end of the delay provided by the transport terminal.

Accordingly, it is possible for the transmission system of the present invention to reliably switch a connection from the working channel line to the protection channel line or vice versa while avoiding instantaneous cutoff when one of the working and protection channel lines has failed. The transmission system of the present invention is remarkably effective in providing increased reliability for data communication in a transmission system having terminals linked in a redundant structure.

BRIEF DESCRIPTION OF THE DRAWINGS

The above and other objects, features and advantages of the present invention will become more apparent from the following detailed description when read in conjunction with the accompanying drawings in which:

FIG. 19 is a diagram for explaining an operation of a comparator of the control unit of FIG. 18;

DETAILED DESCRIPTION OF THE PREFERRED EMBODIMENTS

A description will now be given of the preferred embodiments of the present invention with reference to the accompanying drawings.

Figure 1:
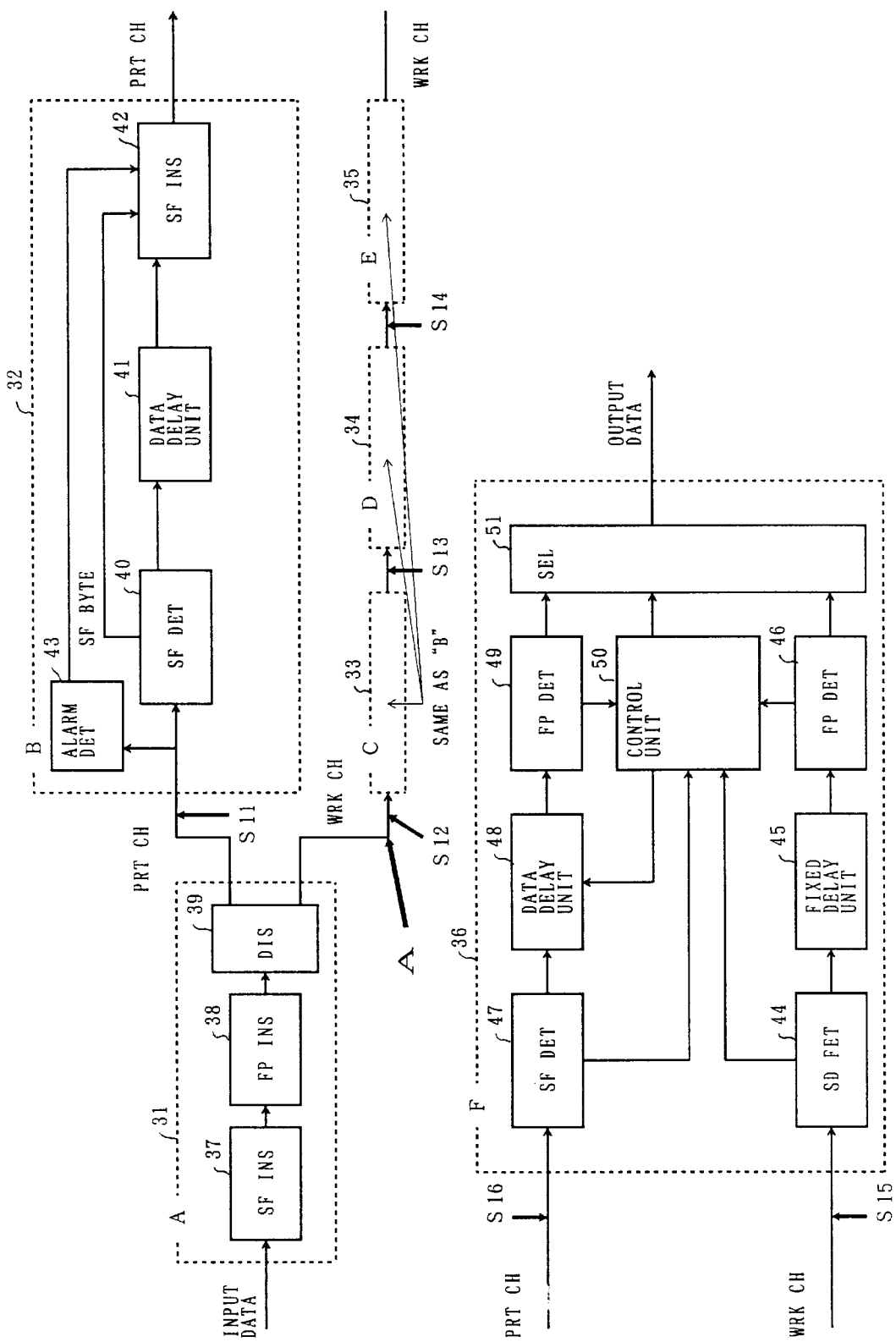
FIG. 1 is a block diagram of a first embodiment of a transmission system of the present invention.

FIG. 1 shows one embodiment of a transmission system of the present invention. In the present embodiment, the transmission system is provided to include a plurality of terminals linked by a working channel line and a protection channel line in a redundant structure. When one of the two channel lines in the transmission system of the present embodiment fails, a connection is switched from the working channel line to the protection channel line or vice versa while avoiding instantaneous cutoff.

As shown in FIG. 1, the transmission system includes a transmission terminal 31 (called a terminal A), a number of transport terminals 33, 34 and 35 (called terminals C, D and E) and a reception terminal 36 (called a terminal F) which are interconnected by a working channel line (WRK CH). The transmission system further includes the transmission terminal 31 (the terminal A), a transport terminal 32 (called a terminal B), and the reception terminal 36 (the terminal F) which are interconnected by a protection channel line (PRT CH).

In the present embodiment, transmission of a digital signal in the SDH frame format in the transmission system of FIG. 1 is assumed. Normally, the SDH frame is transmitted to the reception terminal 36 through the working channel link (or the terminals A and C through F). When the working channel line has failed, a connection of the transmission system of FIG. 1 is switched to the protection channel line. Then the SDH frame is transmitted to the reception terminal 36 through the protection channel link (or the terminals A, B and F).

Figure 2:
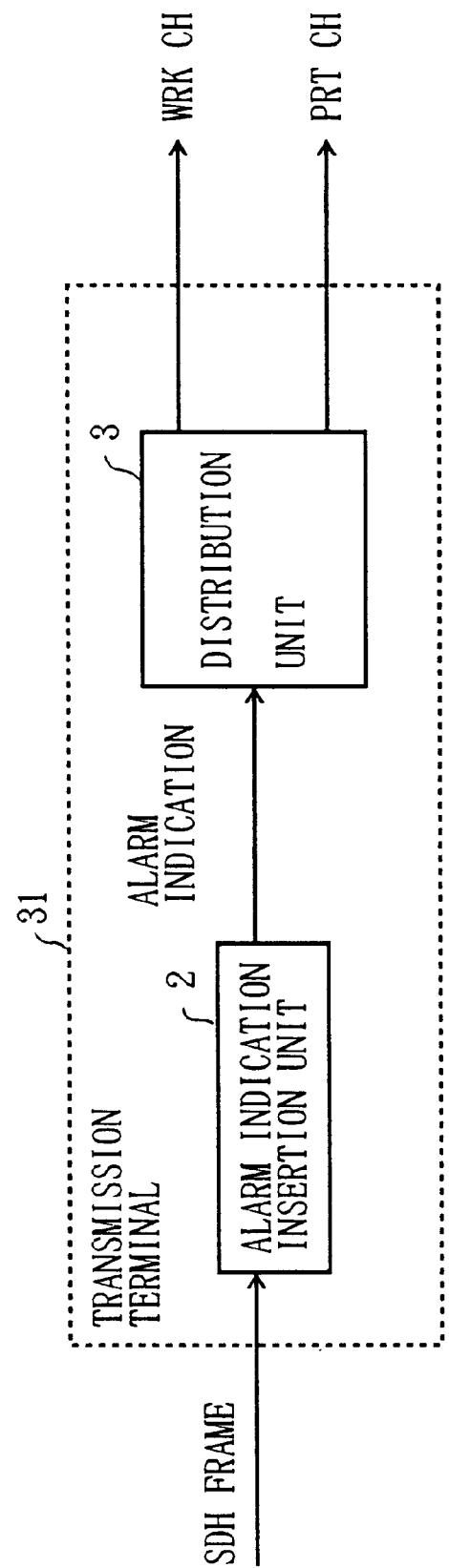
FIG. 2 is a block diagram of basic elements of a transmission terminal in the transmission system of FIG. 1.

FIG. 2 shows basic elements of the transmission terminal 31 in the transmission system of FIG. 1.

As shown in FIG. 2, the transmission terminal 31 comprises an alarm indication insertion unit 2 and a distribution unit 3. The alarm indication insertion unit 2 inserts an alarm indication in the SDH frame at a given location of the SDH frame. The alarm indication indicates whether a related channel line has failed. The SDH frame containing the alarm indication is transmitted to the reception terminal 36 prior to transmission of the data of the SDH frame on the related channel line.

Figure 22:
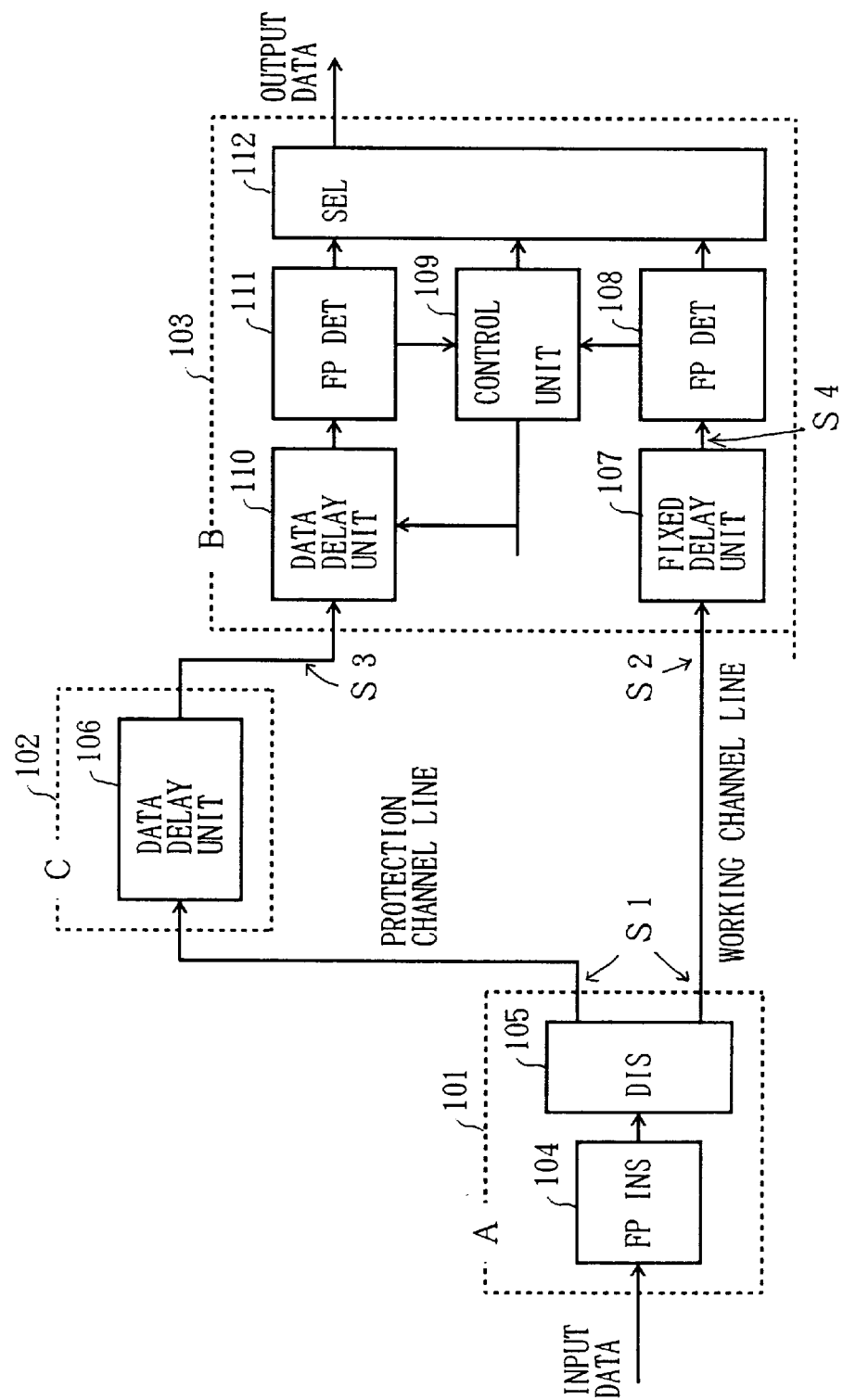
FIG. 22 is a block diagram of a conventional transmission system.
Figure 23:
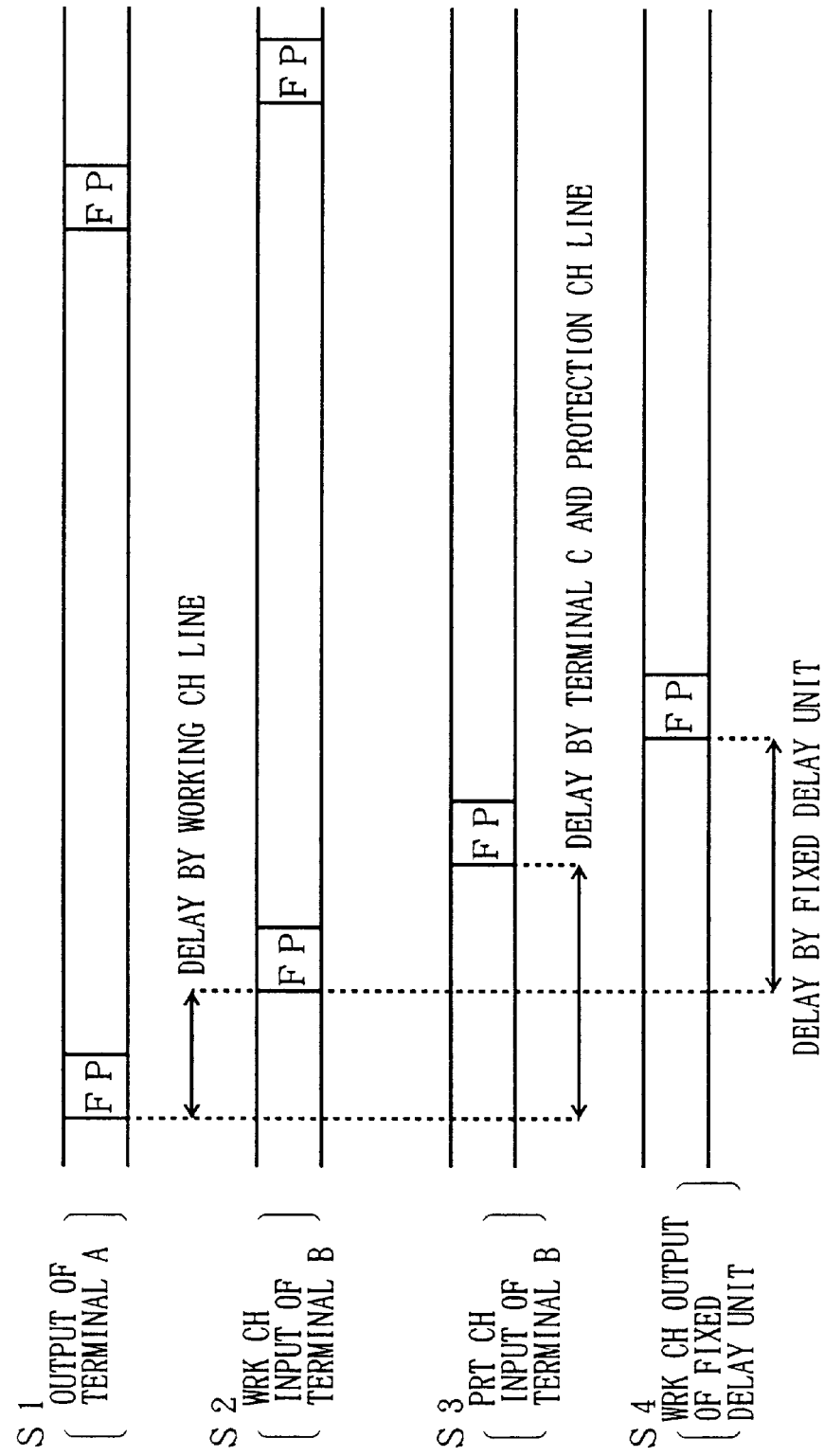
FIG. 23 is a diagram for explaining an operation of the conventional transmission system of FIG. 22.

In the transmission terminal 31 of FIG. 2, the distribution unit 3 supplies the SDH frame containing the alarm indication (from the alarm indication insertion unit 2) and the frame pulse (similar to the frame pulse in the conventional transmission system of FIG. 22) to both the working channel line and the protection channel line.

Figure 3:
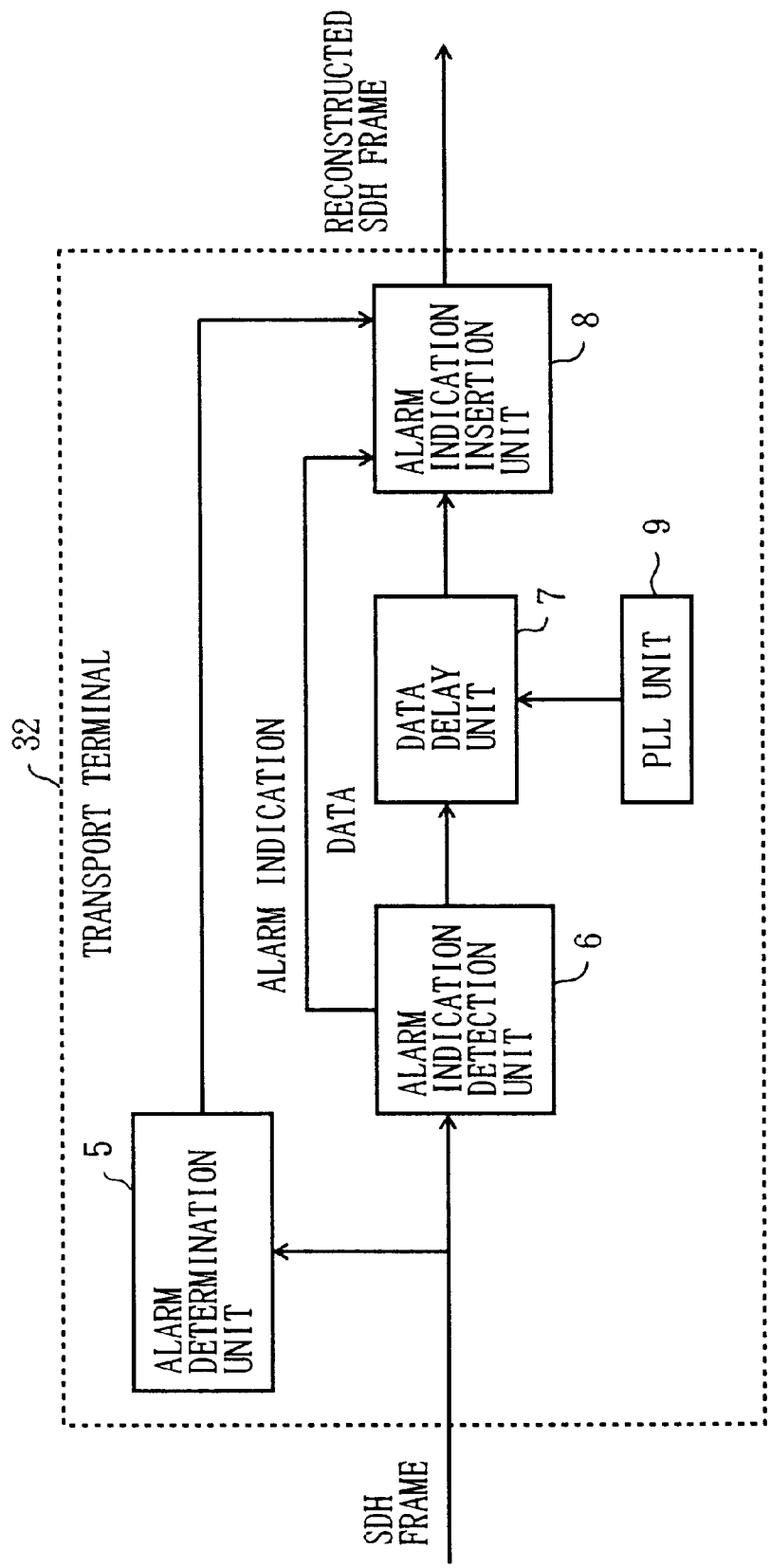
FIG. 3 is a block diagram of basic elements of a transport terminal in the transmission system of FIG. 1.

FIG. 3 shows basic elements of the transport terminal 32 in the transmission system of FIG. 1. The transport terminals 33, 34 and 35 have a construction which is essentially the same as the construction of the transport terminal 32, and a description thereof will be omitted.

As shown in FIG. 3, the transport terminal 32 comprises an alarm determination unit 5, an alarm indication detection unit 6, a data delay unit 7, and an alarm indication insertion unit 8.

In the transport terminal 32 of FIG. 3, the alarm determination unit 5 determines whether a related channel line has failed based on an operating condition of the related channel line. When the alarm determination unit 5 determines that the related channel line has failed, the alarm determination unit supplies a signal indicating occurrence of the failure of the related channel line prior to transmission of the data on the related channel line.

The alarm indication detection unit 6 separates the alarm indication from the SDH frame from the transmission terminal 31 to separately supply the alarm indication to the alarm indication insertion unit 8 and a first SDH frame containing no alarm indication to the data delay unit 7.

The data delay unit 7 provides a delay for the first SDH frame from the alarm indication detection unit 6. The data delay unit 7 is called an elastic memory. The data of the first SDH frame is delayed on the related channel line by the data delay unit 7.

The alarm indication insertion unit 8 inserts the alarm indication from the alarm indication detection unit 6 into the first SDH frame from the data delay unit 7, so that the alarm indication insertion unit 8 supplies a reconstructed SDH frame containing the alarm indication to the reception terminal 36 prior to transmission of the data on the related channel line.

Further, in the transport terminal 32 of FIG. 3, a phase-locked loop (PLL) unit 9 is provided. The phase-locked loop unit 9 continuously generate a clock on the related channel line even when the related channel line has failed due to stopping of a clock supplied on the related channel line. This allows the data delay unit 7 to continuously supply, to the alarm indication insertion unit 8, the first SDH frame synchronous with the clock generated by the phase-locked loop unit 9.

Figure 4:
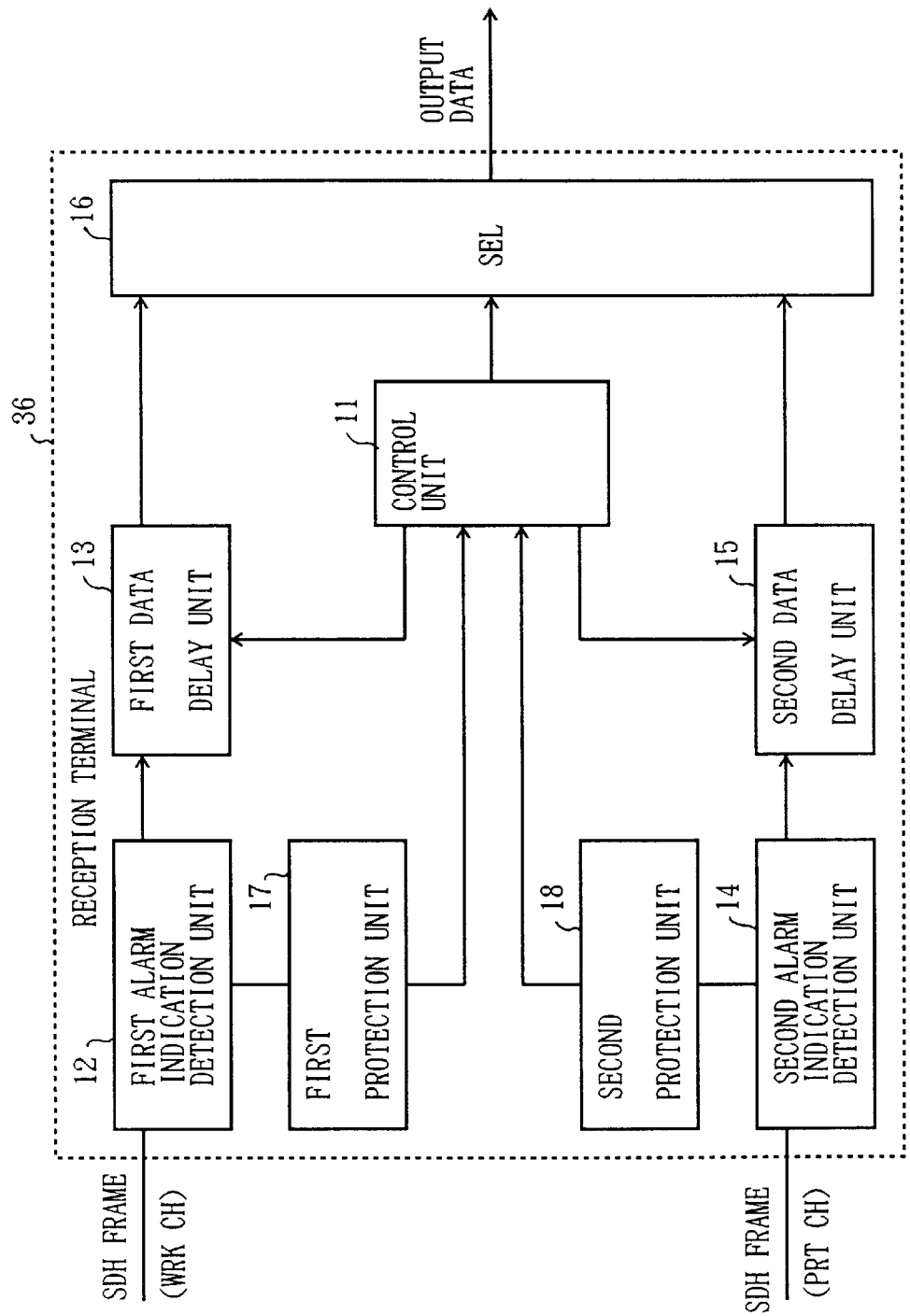
FIG. 4 is a block diagram of basic elements of a reception terminal in the transmission system of FIG. 1.

FIG. 4 shows basic elements of the reception terminal 36 in the transmission system of FIG. 1.

As shown in FIG. 4, the reception terminal 36 comprises a control unit 11, a first alarm indication detection unit 12, a first data delay unit 13, a second alarm indication detection unit 14, a second data delay unit 15, and a selector (SEL) 16.

In the reception terminal 36 of FIG. 4, the control unit 11 controls the selector 16 to output a selected one of the SDH frame on the working channel line (the WRK CH) and the SDH frame on the protection channel line (the PRT CH) in response to the alarm indication received by the control unit 11. When one of the WRK CH and the PRT CH has failed, the control unit 11 switches a connection from one of the WRK CH and the PRT CH to the other while avoiding instantaneous cutoff by controlling the selector 16.

The first alarm indication detection unit 12 separates the alarm indication from the SDH frame on the WRK CH from the transport terminal 35 to separately supply the alarm indication to the control unit 11 and a second SDH frame containing no alarm indication to the first data delay unit 13.

The first data delay unit 13 provides a delay for the second SDH frame on the WRK CH from the first alarm indication detection unit 12. The delayed SDH frame from the first data delay unit 13 is supplied to the selector 16.

The second alarm indication detection unit 14 separates the alarm indication from the SDH frame on the PRT CH from the transport terminal 32 to separately supply the alarm indication to the control unit 11 and a third SDH frame containing no alarm indication to the second data delay unit 15.

The second data delay unit 15 provides a delay for the third SDH frame on the PRT CH from the second alarm indication detection unit 14. The delayed SDH frame from the second data delay unit 15 is supplied to the selector 16.

The control unit 11 controls the delay of the second data delay unit 15 based on the frame pulse from the second SDH frame on the WRK CH such that a position of the frame pulse in the third SDH frame on the PRT CH matches with a position of the frame pulse in the second SDH frame on the WRK CH.

The selector 16 outputs the selected one of the SDH frame on the WRK CH from the first data delay unit 13 and the SDH frame on the PRT CH from the second data delay unit 15 as the output data from the terminal 36 under the control of the control unit 11.

Further, in the reception terminal 36 of FIG. 4, a first protection unit 17 and a second protection unit 18 are provided.

The first protection unit 17 is provided between the first alarm indication detection unit 12 and the control unit 11. The first protection unit 17 prevents a noise from being supplied to the control unit 11 when the alarm indication from the first alarm indication detection unit 12 is supplied to the control unit 11.

The second protection unit 18 is provided between the second alarm indication detection unit 14 and the control unit 11. The second protection unit 18 prevents a noise from being supplied to the control unit 11 when the alarm indication from the second alarm indication detection unit 14 is supplied to the control unit 11.

In the transmission terminal 31 (the terminal A) of FIG. 1, an SF insertion unit.(SF INS) 37, an FP insertion unit (FP INS) 38, and a distribution unit (DIS) 39 are provided.

The SF insertion unit (SF INS) 37 receives the SDH frame and inserts an SF byte in the SDH frame at a given location of the SDH frame. The SF byte inserted by the SF INS 37 contains an alarm indication which indicates whether the related channel line delivering the SDH frame has failed.

The FP insertion unit (FP INS) 38 receives the SDH frame and inserts a frame pulse (FP) (which is provided for avoiding instantaneous cutoff) in the SDH frame at a given location of the SDH frame. The frame pulse (FP) inserted by the FP INS 38 indicates a reference position in the SDH frame on the related channel line. When a switching command is supplied to the reception terminal 36, the FP in the SDH frame is used by the reception terminal 36 to synchronize the SDH frame on the working channel line with the SDH frame on the protection channel line.

The distribution unit (DIS) 39 supplies the SDH frame containing the SF byte and the FP to both the transport terminal 33 through the working channel line and the transport terminal 32 through the protection channel line.

In the transport terminal 32 (the terminal B) of FIG. 1, an SF detection unit (SF DET) 40, a data delay unit 41, an SF insertion unit (SF INS) 42, and an alarm determination unit (ALARM DET) 43 are provided. The transport terminals 33, 34 and 35 in the transmission system of FIG. 1 have a construction which is essentially the same as the construction of the transport terminal 32 of FIG. 1, and a description thereof will be omitted.

The alarm determination unit 43 determines whether the related channel line has failed based on an operating condition of the related channel line. When it is determined that the related channel line has failed, the alarm determination unit 43 supplies a signal indicating the occurrence of the failure of the related channel line, to the SF insertion unit 42 prior to transmission of data of the SDH frame on the related channel line.

The SF detection unit 40 receives the SDH frame with the SF byte from the terminal A, and separates the SF byte from the SDH frame such that the SF detection unit 40 supplies the SF byte to the SF insertion unit 42 and supplies the second SDH frame (containing no SF byte) to the data delay unit 41.

The data delay unit 41 provides a delay for the second SDH frame on the related channel line from the SF detection unit 40. The data delay unit 41 is called an elastic memory. The SF insertion unit 42 receives the second SDH frame from the data delay unit 41 and the SF byte from the SF detection unit 40. When the related channel line has failed, the SF insertion unit 42 inserts an SF byte indicating the failure of the related channel line into the second SDH frame at the given location of the SDH frame after the delay is provided for the second SDH frame by the data delay unit 41, so that the SF insertion unit 42 supplies a reconstructed SDH frame containing the SF byte to the reception terminal 36 prior to transmission of the data of the second SDH frame on the related channel line.

In the reception terminal 36 (the terminal F) of FIG. 1, an SF detection unit (SF DET) 44, a fixed delay unit 45 and an FP detection unit (FP DET) 46 are provided with respect to the working channel line (WRK CH). Further, in the reception terminal 36, a control unit 50 and a selector (SEL) 51 are provided.

The SF detection unit 44 receives the SDH frame with the SF byte on the WRK CH from the terminal E, and separates the SF byte from the SDH frame such that the SF detection unit 44 supplies the SF byte to the control unit 50 and supplies the second SDH frame (containing no SF byte) to the fixed delay unit 45.

The fixed delay unit 45 provides a fixed delay for the second SDH frame on the WRK CH from the SF detection unit 44. The fixed delay is provided by the fixed delay unit 45 such that a total delay for the SDH frame on the WRK CH due to the transmission between the terminals A and C–F and due to the transmission through the fixed delay unit 45 within the terminal F is always greater than a delay for the SDH frame on the PRT CH due to the transmission between the terminals A, B and F and due to the transmission through the data delay unit 41 within the terminal B.

The FP detection unit 46 receives the second SDH frame on the WRK CH from the fixed delay unit 45 and separates the FP from the second SDH frame. The FP detection unit 46 supplies the FP to the control unit 50 and supplies, to the selector 51, the reconstructed SDH frame (containing no FP) which is the same as the SDH frame originally delivered on the WRK CH from the terminal A.

Further, in the reception terminal 36, an SF detection unit (SF DET) 47, a data delay unit 48, and an FP detection unit (FP DET) 49 are provided with respect to the protection channel line (PRT CH).

The SF detection unit 47 receives the SDH frame with the SF byte on the PRT CH from the terminal B, and separates the SF byte from the SDH frame such that the SF detection unit 41 supplies the SF byte to the control unit 50 and supplies the second SDH frame (containing no SF byte) to the data delay unit 48.

The data delay unit 48 provides a delay for the second SDH frame on the PRT CH from the SF detection unit 47. The data delay unit 48 is called the elastic memory.

The FP detection unit 49 receives the second SDH frame on the PRT CH from the data delay unit 48 and separates the FP from the second SDH frame on the PRT CH. The FP detection unit 49 supplies the FP to the control unit 50 and supplies, to the selector 51, the reconstructed SDH frame (containing no FP) which is the same as the SDH frame originally delivered on the PRT CH from the terminal A.

The control unit 50 receives the FP from the FP detection unit 46 and the FP from the FP detection unit 48, and controls the delay of the data delay unit 48 based on the FP from the FP detection unit 46 such that a position of the FP in the SDH frame on the PRT CH matches with a position of the FP in the SDH frame on the WRK CH. Further, the control unit 50 controls the selector 51 in response to the SF byte from the SF detection unit 44 and the SF byte from the SF detection unit 47, so that the selector 51 outputs a selected one of the SDH frame on the WRK CH from the FP detection unit 46 and the SDH frame on the PRT CH from the FP detection unit 49.

When the SF byte from the SF detection unit 44 indicates the occurrence of the failure of the WRK CH, it is determined that the WRK CH has failed. The control unit 50 switches a connection from the WRK CH to the PRT CH while avoiding instantaneous cutoff by controlling the selector 51 in response to the SF byte from the SF detection unit 44. Similarly, when the SF byte from the SF detection unit 47 indicates the occurrence of the failure of the PRT CH, it is determined that the PRT CH has failed. The control unit 50 switches a connection from the PRT CH to the WRK CH while avoiding instantaneous cutoff by controlling the selector 51 in response to the SF byte from the SF detection unit 47.

The selector 51 outputs the selected one of the SDH frame on the WRK CH from the FP detection unit 46 and the SDH frame on the PRT CH from the FP detection unit 49 as the output data from the terminal F under the control of the control unit 50.

Figure 6:
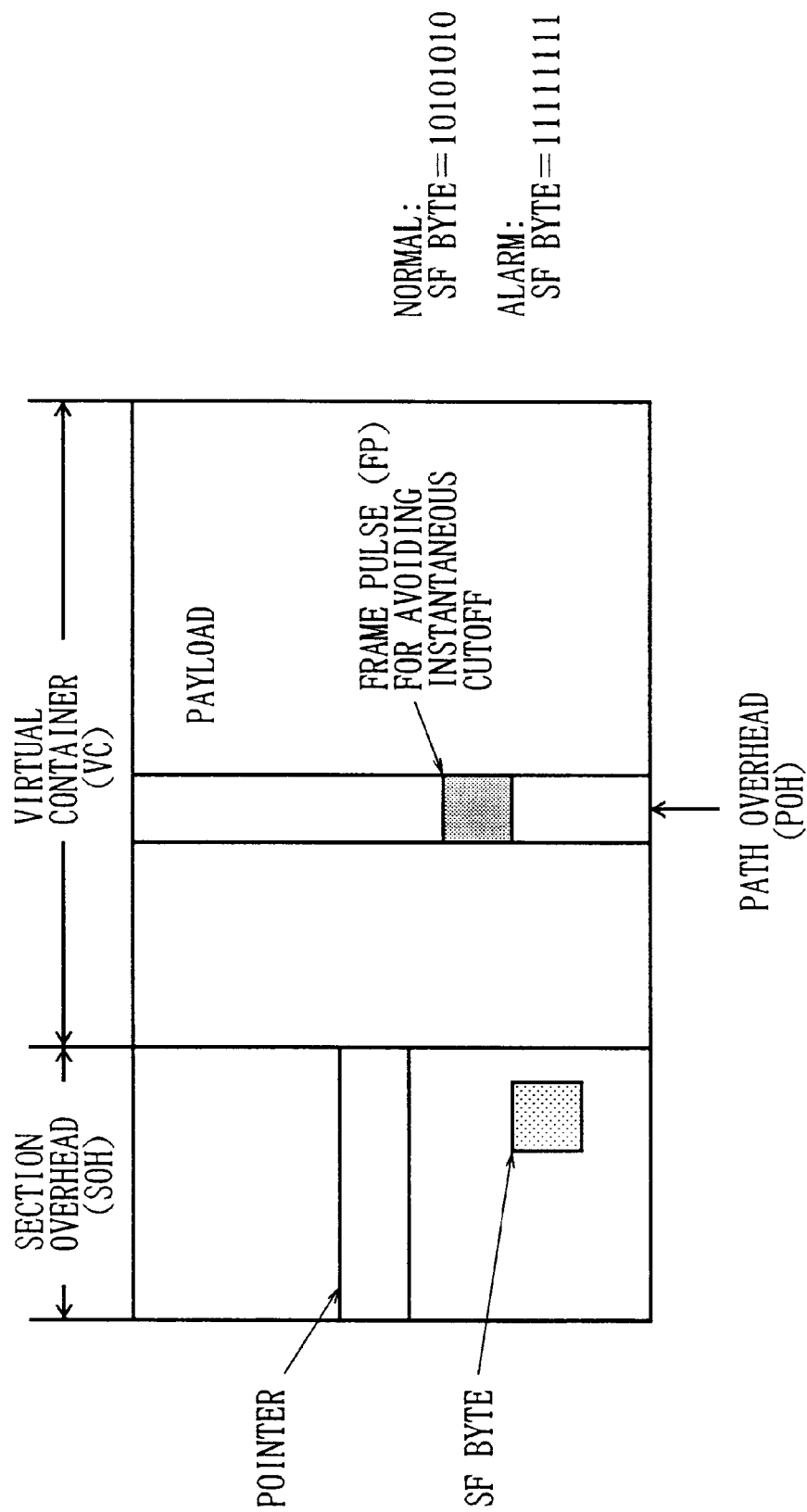
FIG. 6 is a diagram for explaining a SDH frame format of a digital signal transmitted in the transmission system of the present invention.

In the above-described transmission system of FIG. 1, transmission of a digital signal in the SDH frame format is assumed. FIG. 6 shows the SDH frame format of the digital signal transmitted in the transmission system of FIG. 1.

As shown in FIG. 6, in the SDH frame format, a section overhead (SOH) and a virtual container (VC) are provided. In the virtual container (VC), a path overhead (POH) is provided. The virtual container (VC) contains payload data transmitted on a channel line. The payload data in the VC of the SDH frame is a payload signal which is transmitted by the transmission terminal and received by the reception terminal in the transmission system.

In the present embodiment, the SF byte is placed at a given location of the SOH in the SDH frame by the SF insertion unit 37. The SF byte contains an alarm indication which indicates whether the related channel line delivering the SDH frame has failed. In the present embodiment, the SF byte contains "10101010" when the related channel line normally functions, and the SF byte contains "11111111" when the related channel line has failed.

Further, in the present embodiment, the frame pulse (FP) for avoiding instantaneous cutoff is placed at a given location of the head of the payload signal in the SDH frame by the FP insertion unit 38. As described above, the frame pulse (FP) for avoiding instantaneous cutoff indicates a reference position (or the head of the payload signal) of the SDH frame on the related channel line. The frame pulse (FP) is used to synchronize the head of the payload signal on the WRK CH with the head of the payload signal on the PRT CH., and the reference position of the SDH frame, indicated by the FP, is used to synchronize the SDH frame on the WRK CH with the SDH frame on the PRT CH.

Next, a description will be given of an operation of the transmission system of FIG. 1 when the working channel line functions normally.

In the above-described embodiment, when the WRK CH normally functions, the SF insertion unit 37 in the terminal A receives the SDH frame and inserts an SF byte in the SDH frame at the given location of the SOH within the SDH frame. The SF insertion unit 37 at this time writes the SF byte to the SDH frame. In this case, the SF byte contains "10101010", indicating that the related channel line normally functions.

The FP insertion unit 38 inserts a frame pulse (FP) for avoiding instantaneous cutoff in the SDH frame at the given location of the head of the payload signal. The FP indicates a reference position in the SDH frame on the related channel line. The FP in the SDH frame is used by the reception terminal 36 to synchronize the head of the payload signal on the WRK CH with the head of the payload signal on the PRT CH.

The distribution unit 39 supplies the SDH frame containing the SF byte and the FP to both the terminal B through the PRT CH and the terminal C through the WRK CH.

The terminal A and the terminal B are linked by the PRT CH. The SF detection unit 40 in the terminal B receives the SDH frame with the SF byte on the PRT CH from the terminal A and separates the SF byte from the SDH frame. The SF detection unit 40 at this time supplies the SF byte to the SF insertion unit 42, and deletes the SF byte in the SDH frame to supply the second SDH frame (containing no SF byte) to the data delay unit 41.

The data delay unit 41 in the terminal B provides a delay for the second SDH frame on the related channel line from the SF detection unit 40. The SF insertion unit 42 receives the second SDH frame from the data delay unit 41 and the SF byte from the SF detection unit 40. The SF insertion unit 42 at this time inserts the SF byte (="10101010") in the second SDH frame at the given location of the second SDH frame.

The terminal A and the terminals C, D and E are linked by the WRK CH. The terminals C, D and E perform an operation which is essentially the same as the above-mentioned operation of the terminal B, and a description thereof will be omitted.

The terminal E and the terminal F are linked by the WRK CH. The SF detection unit 44 in the terminal F receives the SDH frame with the SF byte on the WRK CH from the terminal E, and separates the SF byte from the SDH frame. The SF detection unit 44 at this time supplies the SF byte (="10101010") to the control unit 50, and deletes the SF byte in the SDH frame to supply the second SDH frame (containing no SF byte) to the fixed delay unit 45.

The fixed delay unit 45 in the terminal F provides the fixed delay for the second SDH frame on the WRK CH. The FP detection unit 46 receives the second SDH frame on the WRK CH from the fixed delay unit 45 and separates the FP from the second SDH frame. The FP detection unit 46 at this time supplies the FP to the control unit 50 and deletes the FP in the SDH frame to supply the reconstructed SDH frame to the selector 51.

The terminal B and the terminal F are linked by the PRT CH. The SF detection unit 47 in the terminal F receives the SDH frame with the SF byte on the PRT CH from the terminal B, and separates the SF byte from the SDH frame. If the PRT CH normally functions, the SF detection unit 47 supplies the SF byte (="10101010") to the control unit 50, and deletes the SF byte in the SDH frame to supply the second SDH frame (containing no SF byte) to the data delay unit 48.

The data delay unit 48 in the terminal F provides the delay for the second SDH frame on the PRT CH. The FP detection unit 49 receives the second SDH frame on the PRT CH from the data delay unit 48 and separates the FP from the second SDH frame. The FP detection unit 49 at this time supplies the FP to the control unit 50 and deletes the FP in the SDH frame to supply the reconstructed SDH frame to the selector 51.

The control unit 50 at this time controls the selector 51 to select the WRK CH link in response to the SF byte from the SF detection unit 44 and the SF byte from the SF detection unit 47, so that the selector 51 outputs the SDH frame on the WRK CH from the FP detection unit 46.

Next, a description will be given of an operation of the transmission system of FIG. 1 when the working channel line has failed due to a break in the working channel line, with reference to FIG. 7. In the transmission system of FIG. 1 in this case, a connection is switched from the WRK CH to the PRT CH while avoiding instantaneous cutoff.

In the transmission system of FIG. 1, it is assumed that the respective data delay units of the terminals B through E equally provide a delay "T0" for the SDH frame on the related channel line.

When the WRK CH has failed due to a break in the channel line at a position "A" between the terminals A and C as indicated in FIG. 1, the SF insertion unit 37 in the terminal A receives the SDH frame and inserts an SF byte (="11111111") in the SDH frame at the given location of the SOH within the SDH frame. The SF insertion unit 37 at this time writes the SF byte to the SDH frame, the content of the SF byte indicating that the related channel line has failed.

The FP insertion unit 38 inserts the frame pulse (FP) in the SDH frame at the given location of the head of the payload signal. The FP in the SDH frame is used by the reception terminal 36 to synchronize the head of the payload signal on the WRK CH with the head of the payload signal on the PRT CH. This procedure is the same as the case in which the WRK CH normally functions.

The distribution unit 39 supplies the SDH frame containing the SF byte and the FP to both the terminal B through the PRT CH and the terminal C through the WRK CH.

The SF detection unit 40 in the terminal B receives the SDH frame with the SF byte on the PRT CH from the terminal A and separates the SF byte from the SDH frame. The SF detection unit 40 at this time supplies the SF byte to the SF insertion unit 42, and deletes the SF byte in the SDH frame to supply the second SDH frame (containing no SF byte) to the data delay unit 41. However, after the WRK CH has failed due to the break at the position "A" between the terminals A and C, the terminal C does not subsequently receive the SDH frame with the SF byte on the WRK CH from the terminal A.

Figure 7:
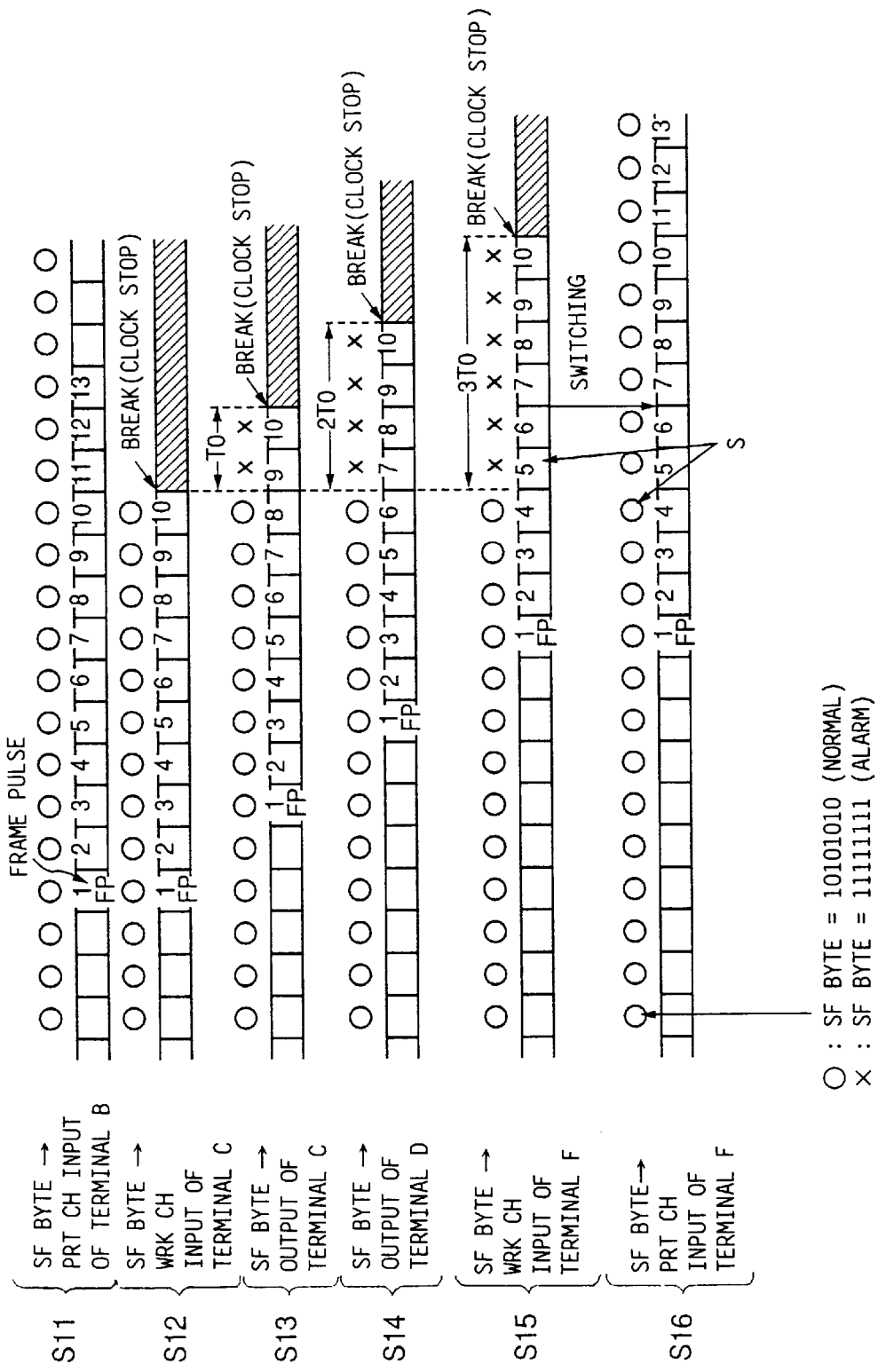
FIG. 7 is a diagram for explaining an operation of the transmission system of FIG. 1.

The signal at the PRT CH input of the terminal B and the signal at the WRK CH input of the terminal C are indicated by "S11" and "S12" in FIG. 7.

In the example of FIG. 7, the break in the working channel line (WRK CH) at the position "A" has occurred during transmission of the 11th SDH frame by the terminal A. The alarm determination unit 43 in the terminal C determines that the WRK CH has failed based on the operating condition of the WRK CH from the terminal A. In the terminal C, the alarm determination unit 43 supplies a signal indicating the occurrence of the failure of the WRK CH to the SF insertion unit 42 prior to transmission of data of the SDH frame on the WRK CH. When it is determined that the WRK CH has failed, the SF detection unit 40 in the terminal C supplies the SF byte (="11111111") to the SF insertion unit 42, and deletes the SF byte in the SDH frame to supply the second SDH frame (containing no SF byte) to the data delay unit 41.

The data delay unit 41 in the terminal C provides the delay "T0" for the second SDH frame on the WRK CH from the SF detection unit 40. The SF insertion unit 42 inserts the SF byte (="11111111") in the second SDH frame at the given location of the second SDH frame.

The signal on the WRK CH at the output of the terminal C is indicated by "S13" in FIG. 7. As indicated by "S13" in FIG. 7, after the WRK CH has failed due to the break at the position "A" between the terminals A and C, the SDH frame (or the 9th and 10th SDH frames) stored in the data delay unit 41 of the terminal C can be transmitted on the WRK CH to the terminal D.

Specifically, in the example of FIG. 7, when the break has occurred during the transmission of the 11th SDH frame, the SF insertion unit 42 of the terminal C inserts the SF byte (="11111111") in the 9th and 10th SDH frames respectively, and supplies these SDH frames with the SF byte to the terminal D as indicated by "S13" in FIG. 7.

The terminals C, D and E are linked by the WRK CH. The terminals D and E perform an operation which is the same as the above-described operation of the terminal C. The signal on the WRK CH at the output of the terminal D and the signal on the WRK CH at the output of the terminal E are indicated by "S14" and "S15" in FIG. 7. As indicated by "S15" in FIG. 7, the terminal E continuously transmits the SDH frames with the SF byte (="11111111") on the WRK CH to the terminal F during a period of time from the occurrence of the break in the channel line to the end of the delay "3T0" by the data delay units 41 of the terminals C through E. The terminal F switches the connection from the WRK CH to the PRT CH while avoiding instantaneous cutoff within the period "3T0".

The signal on the PRT CH at the input of the terminal F is indicated by "S16" in FIG. 7. As indicated by "S15" in FIG. 7, the SF detection unit 44 in the terminal F receives the SDH frame with the SF byte (="11111111") on the WRK CH from the terminal E, and separates the SF byte from the SDH frame. The SF detection unit 44 at this time supplies the SF byte (="11111111") to the control unit 50, and deletes the SF byte in the SDH frame to supply the second SDH frame (containing no SF byte) to the fixed delay unit 45.

The fixed delay unit 45 in the terminal F provides the fixed delay for the second SDH frame on the WRK CH. The FP detection unit 46 supplies the FP to the control unit 50 and deletes the FP in the SDH frame to supply the reconstructed SDH frame to the selector 51.

At the same time, as indicated by "S16" in FIG. 7, the SF detection unit 47 in the terminal F receives the SDH frame with the SF byte (="10101010") on the PRT CH from the terminal B, and separates the SF byte from the SDH frame. If the PRT CH normally functions, the SF detection unit 47 supplies the. SF byte (="10101010") to the control unit 50, and deletes the SF byte in the SDH frame to supply the second SDH frame (containing no SF byte) to the data delay unit 48.

The data delay unit 48 in the terminal F provides the delay for the second SDH frame on the PRT CH. The FP detection unit 49 supplies the FP to the control unit 50 and deletes the FP in the SDH frame to supply the reconstructed SDH frame to the selector 51. The control unit 50 controls the delay of the data delay unit 48 based on the FP from the FP detection unit 46 such that the position of the FP in the SDH frame on the PRT CH matches with the position of the FP in the SDH frame on the WRK CH.

As indicated by "S" in FIG. 7, the control unit 50 receives the SF byte (="11111111") from the SF detection unit 44 and the SF byte (="10101010") from the SF detection unit 47 upon the occurrence of the break in the WRK CH at the position "A". It is determined that the WRK CH has failed but the PRT CH normally functions. As indicated by "S15" and "S16" in FIG. 7, within the period "3T0", the control unit 50 controls the selector 51 to switch the connection from the WRK CH to the PRT CH while avoiding instantaneous cutoff, so that the selector 51 outputs the SDH frame on the PRT CH from the FP detection unit 49 as the output data of the terminal F. In the transmission system of FIG. 1, the SDH frame on the PRT CH at this time is synchronous with the SDH frame on the WRK CH, and the switching is performed within the period "3T0". Therefore, it is possible to avoid instantaneous cutoff.

Figure 8:
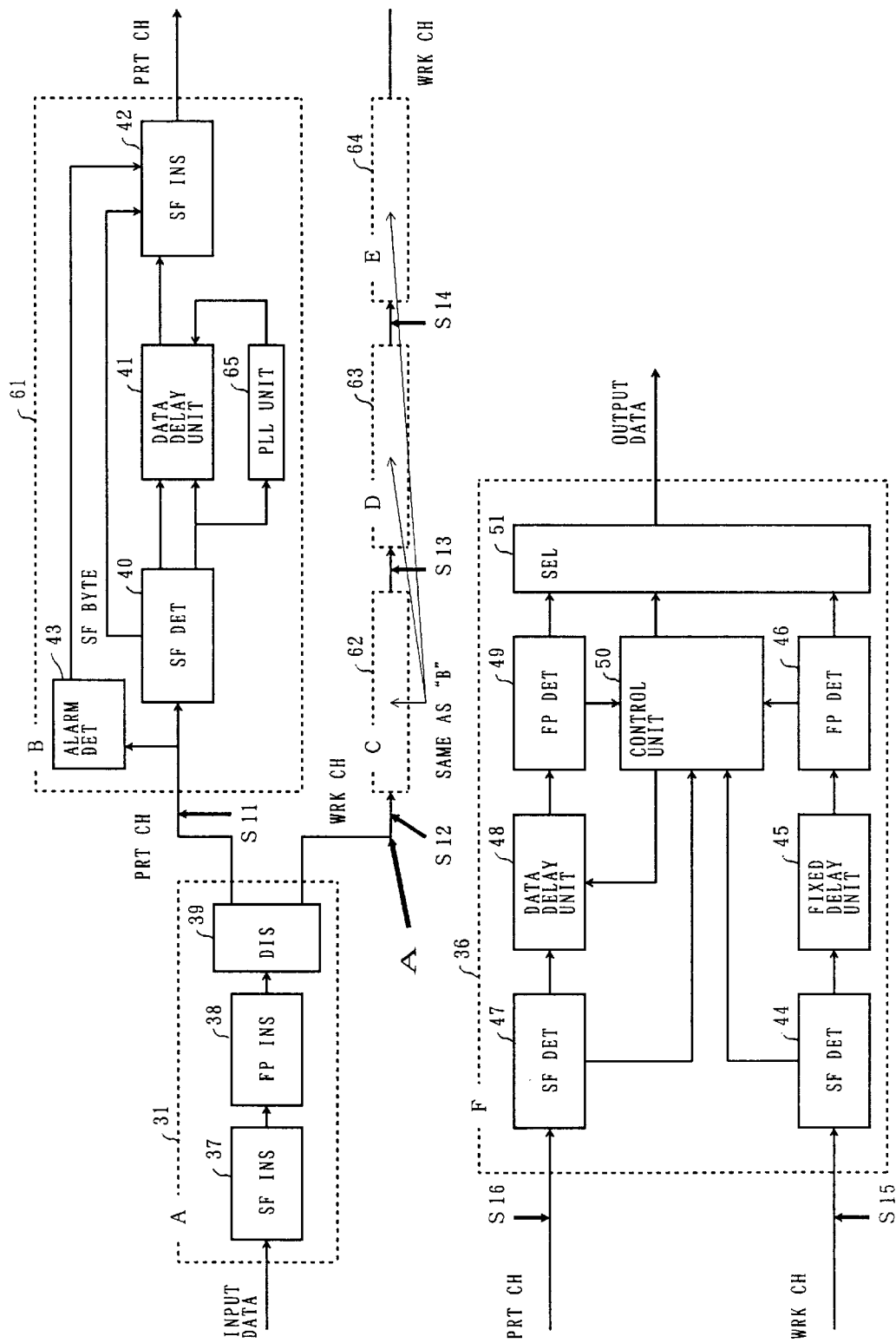
FIG. 8 is a block diagram of a modification of the transmission system of FIG. 1.

FIG. 8 shows a modification of the transmission system of FIG. 1. In FIG. 8, the elements which are the same as corresponding elements in FIG. 1 are designated by the same reference numerals, and a description thereof will be omitted.

As shown in FIG. 8, in the transmission system of the present embodiment, a transport terminal 61 (or the terminal B) is substituted for the transport terminal 32 in the transmission system of FIG. 1. Similarly, transport terminals 62, 63 and 64 (or the terminals C, D and E) are substituted for the transport terminals 33, 34 and 35 in the transmission system of FIG. 1. The transport terminals 62–64 have a construction which is essentially the same as a construction of the transport terminal 61 of FIG. 8, and a description thereof will be omitted.

In the transport terminal 61 of FIG. 8, the SF detection unit (SF DET) 40, the data delay unit 41, the SF insertion unit (SF INS) 42, the alarm determination unit (ALARM DET) 43, and a phase-locked loop (PLL) unit 65 are provided.

The alarm determination unit 43 determines whether the related channel line has failed based on an operating condition of the related channel line. When it is determined that the related channel line has failed, the alarm determination unit 43 supplies a signal indicating the occurrence of the failure of the related channel line, to the SF insertion unit 42 prior to transmission of data of the SDH frame on the related channel line.

The SF detection unit 40 receives the SDH frame with the SF byte from the terminal A, and separates the SF byte from the SDH frame such that the SF detection unit 40 supplies the SF byte to the SF insertion unit 42 and supplies the second SDH frame (containing no SF byte) to the data delay unit 41.

The data delay unit 41 provides a delay for the second SDH frame on the related channel line from the SF detection unit 40. The SF insertion unit 42 receives the second SDH frame from the data delay unit 41 and the SF byte from the SF detection unit 40. When the related channel line has failed, the SF insertion unit 42 inserts the SF byte in the second SDH frame at the given location of the SDH frame after the delay is provided for the second SDH frame by the data delay unit 41.

The PLL unit 65 continuously generates a clock on the related channel line even when the related channel line has failed due to stopping of a clock supplied on the related channel line. By using the clock generated by the PLL unit 65, the data delay unit 41 can supply, to the SF insertion unit 42, the second SDH frame synchronous with the generated clock even when the related channel line has failed.

In the embodiment of FIG. 8, by the use of the PLL unit 65 in the transport terminal 61, it is possible to reliably switch a connection from the working channel line to the protection channel line while avoiding instantaneous cutoff when the working channel line has failed due to the stopping of the clock supplied on the working channel line.

Similar to the embodiment of FIG. 1, in the transmission system of FIG. 8, transmission of a digital signal in the SDH frame format of FIG. 6 is assumed.

A description will be given of an operation of the transmission system of FIG. 8 when the WRK CH has failed due to the stopping of the clock supplied on the WRK CH, with reference to FIG. 7.

In the transmission system of FIG. 8 in this case, a connection is switched from the WRK CH to the PRT CH while avoiding instantaneous cutoff.

In the transmission system of FIG. 8, it is assumed that the respective data delay units of the terminals B through E equally provide a delay "T0" for the SDH frame on the related channel line.

When the WRK CH has failed due to the stopping of the clock supplied on the WRK CH at a position "A" between the terminals A and C as indicated in FIG. 8, the SF insertion unit 37 in the terminal A receives the SDH frame and inserts an SF byte (="11111111") in the SDH frame at the given location of the SOH within the SDH frame. The SF insertion unit 37 at this time writes the SF byte to the SDH frame, the content of the SF byte indicating that the related channel line has failed.

The FP insertion unit 38 inserts the frame pulse (FP) in the SDH frame at the given location of the head of the payload signal. The FP in the SDH frame is used by the reception terminal 36 to synchronize the head of the payload signal on the WRK CH with the head of the payload signal on the PRT CH. This procedure is the same as the case in which the WRK CH normally functions.

The distribution unit 39 supplies the SDH frame containing the SF byte and the FP to both the terminal B through the PRT CH and the terminal C through the WRK CH.

The SF detection unit 40 in the terminal B receives the SDH frame with the SF byte on the PRT CH from the terminal A and separates the SF byte from the SDH frame. The SF detection unit 40 at this time supplies the SF byte to the SF insertion unit 42, and deletes the SF byte in the SDH frame to supply the second SDH frame (containing no SF byte) to the data delay unit 41. However, after the WRK CH has failed due to the stopping of the clock at the position "A" between the terminals A and C, the terminal C does not subsequently receive the SDH frame with the SF byte on the WRK CH from the terminal A.

The signal at the PRT CH input of the terminal B and the signal at the WRK CH input of the terminal C are indicated by "S11" and "S12" in FIG. 7.

In the example of FIG. 7, the stopping of the clock supplied on the working channel line (WRK CH) at the position "A" has occurred during transmission of the 11th SDH frame by the terminal A. The alarm determination unit 43 in the terminal C determines that the WRK CH has failed based on the operating condition of the WRK CH from the terminal A. In the terminal C, the alarm determination unit 43 supplies a signal indicating the occurrence of the failure of the WRK CH to the SF insertion unit 42 prior to transmission of data of the SDH frame on the related channel line. When it is determined that the WRK CH has failed, the SF detection unit 40 in the terminal C supplies the SF byte (="11111111") to the. SF insertion unit 42, and deletes the SF byte in the SDH frame to supply the second SDH frame (containing no SF byte) to the data delay unit 41.

The data delay unit 41 in the terminal C provides the delay "T0" for the second SDH frame on the WRK CH from the SF detection unit 40. The SF insertion unit 42 inserts the SF byte (="11111111") in the second SDH frame at the given location of the second SDH frame.

The signal on the WRK CH at the output of the terminal C is indicated by "S13" in FIG. 7. As indicated by "S13" in FIG. 7, after the WRK CH has failed due to the stopping of the clock at the position "A" between the terminals A and C, the SDH frame (or the 9th and 10th SDH frames) stored in the data delay unit 41 of the terminal C can be transmitted on the WRK CH to the terminal D. The PLL unit 65 continuously generates a clock on the WRK CH even when the WRK CH has failed due to the stopping of the clock.

Specifically, in the example of FIG. 7, when the stopping of the clock has occurred during the transmission of the 11th SDH frame, the SF insertion unit 42 of the terminal C inserts the SF byte (="11111111") in the 9th and 10th SDH frames respectively, and supplies these SDH frames with the SF byte to the terminal D as indicated by "S13" in FIG. 7.

The terminals C, D and E are linked by the WRK CH. The terminals D and E perform an operation which is the same as the above-described operation of the terminal C. The signal on the WRK CH at the output of the terminal D and the signal on the WRK CH at the output of the terminal E are indicated by "S14" and "S15" in FIG. 7. As indicated by "S15" in FIG. 7, the terminal E continuously transmits the SDH frames with the SF byte.(="11111111") on the WRK CH to the terminal F during a period of time from the occurrence of the stopping of the clock to the end of the delay "3T0" by the data delay units 41 of the terminals C through E. The terminal F switches the connection from the WRK CH to the PRT CH while avoiding instantaneous cutoff within the period "3T0".

The signal on the PRT CH at the input of the terminal F is indicated by "S16" in FIG. 7. As indicated by "S15" in FIG. 7, the SF detection unit 44 in the terminal F receives the SDH frame with the SF byte (="11111111") on the WRK CH from the terminal E, and separates the SF byte from the SDH frame. The SF detection unit 44 at this time supplies the SF byte (="11111111") to the control unit 50, and deletes the SP byte in the SDH frame to supply the second SDH frame (containing no SF byte) to the fixed delay unit 45.

The fixed delay unit 45 in the terminal F provides the fixed delay for the second SDH frame on the WRK CH. The FP detection unit 46 supplies the FP to the control unit 50 and deletes the FP in the SDH frame to supply the reconstructed SDH frame to the selector 51.

At the same time, as indicated by "S16" in FIG. 7, the SF detection unit 47 in the terminal F receives the SDH frame with the SF byte (="10101010") on the PRT CH from the terminal B, and separates the SF byte from the SDH frame. If the PRT CH normally functions, the SF detection unit 47 supplies the SF byte (="10101010") to the control unit 50, and deletes the SF byte in the SDH frame to supply the second SDH frame (containing no SF byte) to the data delay unit 48.

The data delay unit 48 in the terminal F provides the delay for the second SDH frame on the PRT CH. The FP detection unit 49 supplies the FP to the control unit 50 and deletes the FP in the SDH frame to supply the reconstructed SDH frame to the selector 51. The control unit 50 controls the delay of the data delay unit 48 based on the FP from the FP detection unit 46 such that the position of the FP in the SDH frame on the PRT CH matches with the position of the FP in the SDH frame on the WRK CH.

As indicated by "S" in FIG. 7, the control unit 50 receives the SF byte (="11111111") from the SF detection unit 44 and the SF byte (="10101010") from the SF detection unit 47 upon the occurrence of the stopping of the clock at the position "A". It is determined that the WRK CH has failed but the PRT CH normally functions. As indicated by "S15" and "S16" in FIG. 7, within the period "3T0", the control unit 50 controls the selector 51 to switch the connection from the WRK CH to the PRT CH while avoiding instantaneous cutoff, so that the selector 51 outputs the SDH frame on the PRT CH from the FP detection unit 49 as the output data of the terminal F. In the transmission system of FIG. 1, the SDH frame on the PRT CH at this time is synchronous with the SDH frame on the WRK CH, and the switching is performed within the period "3T0". Therefore, it is possible to avoid instantaneous cutoff.

Figure 9:
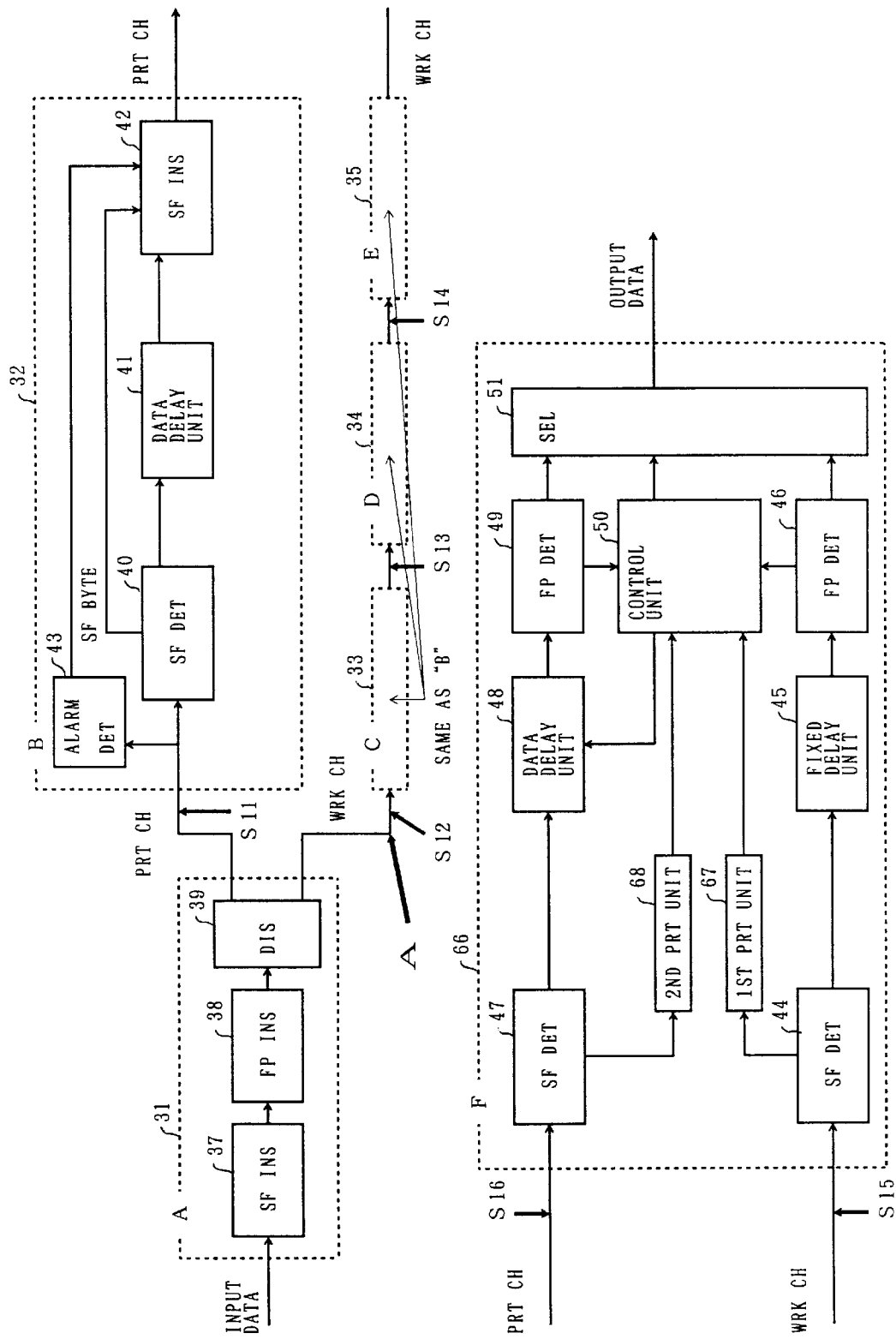
FIG. 9 is a block diagram of another modification of the transmission system of FIG. 1.

FIG. 9 shows another modification of the transmission system of FIG. 1. In FIG. 9, the elements which are the same as corresponding elements in FIG. 1 are designated by the same reference numerals, and a description thereof will be omitted.

As shown in FIG. 9, in the transmission system of the present embodiment, a reception terminal 66 (or the terminal F) is substituted for the reception terminal 36 in the transmission system of FIG. 1.

In the reception terminal 66 of FIG. 9, the SF detection unit 44, the fixed delay unit 45, the FP detection unit 46, the SF detection unit 47, the data delay unit 48, the FP detection unit 49, the control unit 50, the selector 51, a first protection unit (1ST PRT UNIT) 67, and a second protection unit (2ND PRT UNIT) 68 are provided.

In the present embodiment, the first protection unit 67 is provided between the SF detection unit 44 and the control unit 50 to prevent a noise from being supplied to the control unit 50 when the SF byte from the SF detection unit 44 is supplied to the control unit 50. The second protection unit 68 is provided between the SF detection unit 47 and the control unit 50 to prevent a noise from being supplied to the control unit 50 when the SF byte from the SF detection unit 47 is supplied to the control unit 50.

If the noise is received by the control unit 50 with the SF byte from the SF detection unit 44 or the SF byte from the SF detection unit 47, the control unit 50 may perform an erroneous switching of the connection. By the use of the first and second protection units 67 and 68, it is possible for the transmission system of the present embodiment to prevent an erroneous switching from being performed due to the noise. It is possible to provide increased reliability for data communication in the transmission system.

Figure 10:
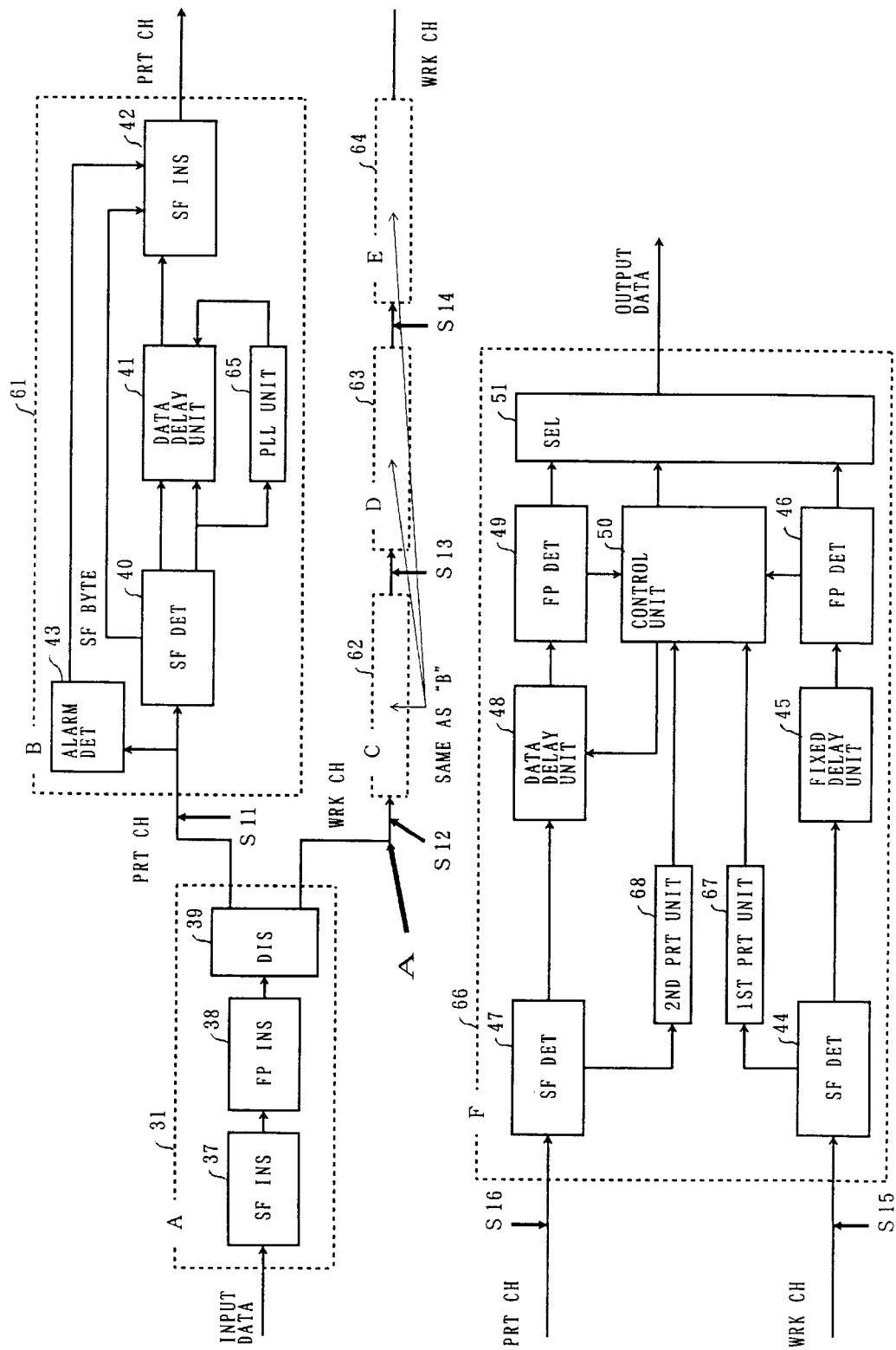
FIG. 10 is a block diagram of a further modification of the transmission system of FIG. 1.

FIG. 10 shows a further modification of the transmission system of FIG. 1. In FIG. 10, the elements which are the same as corresponding elements in FIG. 1 are designated by the same reference numerals, and a description thereof will be omitted.

As shown in FIG. 10, in the transmission system of the present embodiment, the transport terminal 61 (or the terminal B) is substituted for the transport terminal 32 in the transmission system of FIG. 1. Similarly, the transport terminals 62, 63 and 64 (or the terminals C, D and E) are substituted for the transport terminals 33, 34 and 35 in the transmission system of FIG. 1. The transport terminals 62–64 have a construction which is essentially the same as a construction of the transport terminal 61 of FIG. 10, and a description thereof will be omitted.

Similar to the embodiment of FIG. 8, in the transport terminal 61 of FIG. 10, the phase-locked loop (PLL) unit 65 is provided. The operation of the phase-locked loop unit 65 in the transport terminal 61 of FIG. 10 is the same as the operation of the phase-locked loop unit 65 of the embodiment of FIG. 8, and a description thereof will be omitted.

Further, in the transmission system of FIG. 10, the reception terminal 66 (or the terminal F) is substituted for the reception terminal 36 in the transmission system of FIG. 1.

Similar to the embodiment of FIG. 9, in the reception terminal 66 of FIG. 10, the first protection unit (1ST PRT UNIT) 67 and the second protection unit (2ND PRT UNIT) 68 are provided. The operations of the first and second protection units 67 and 68 in the present embodiment are the same as the operations of the corresponding elements of the embodiment of FIG. 9, and a description thereof will be omitted.

In the present embodiment of FIG. 10, by the use of the PLL unit 65 in the transport terminal 61, it is possible to reliably switch a connection from the working channel line to the protection channel line while avoiding instantaneous cutoff when the working channel line has failed due to the stopping of the clock supplied on the working channel line. Further, by the use of the first and second protection units 67 and 68, it is possible for the transmission system of the present embodiment to prevent an erroneous switching from being performed due to the noise. It is possible to provide increased reliability for data communication in the transmission system.

Figure 11:
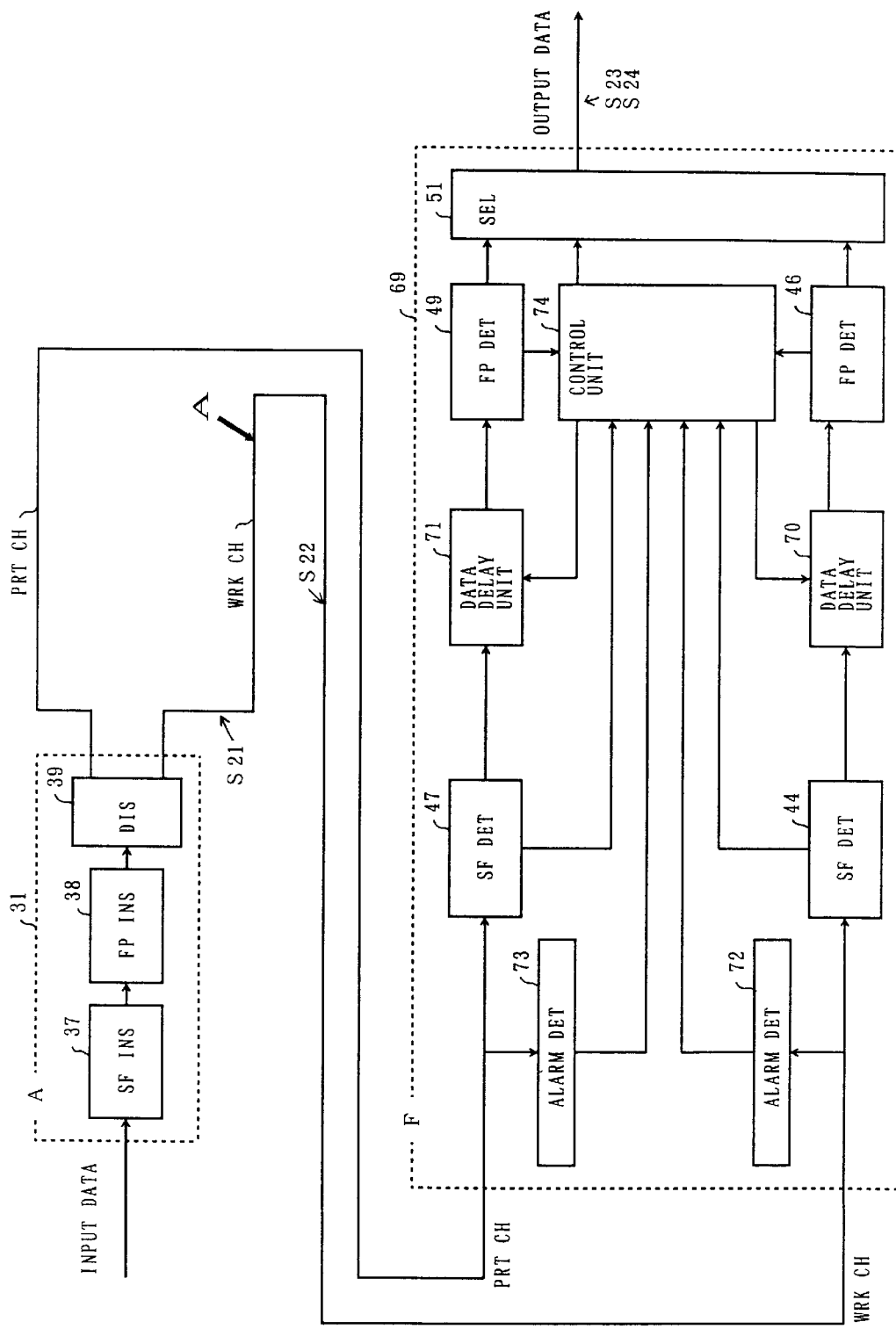
FIG. 11 is a block diagram of a second embodiment of the transmission system of the present invention.

FIG. 11 shows a second embodiment of the transmission system of the present invention. In FIG. 11, the elements which are the same as corresponding elements in FIG. 1 are designated by the same reference numerals, and a description thereof will be omitted.

The transmission system of FIG. 11 includes a plurality of terminals linked by the working channel line (WRK CH) and the protection channel line (PRT CH) in a redundant structure. When one of the two channel lines in the transmission system of the present embodiment has failed, a connection is switched from the WRK CH to the PRT CH or vice versa while avoiding instantaneous cutoff.

As shown in FIG. 11, the transmission system includes the transmission terminal 31 (the terminal A) and a reception terminal 69 (the terminal F) which are interconnected by the WRK CH and the PRT CH in the redundant structure.

In the present embodiment, transmission of a digital signal in the SDH frame format in the transmission system of FIG. 11 is assumed. Normally, the SDH frame is transmitted from the transmission terminal 31 to the reception terminal 69 through the WRK CH. When the WRK CH has failed, a connection of the transmission system of FIG. 11 is switched to the PRT CH. Then the SDH frame is transmitted to the reception terminal 69 through the PRT CH.

Figure 5:
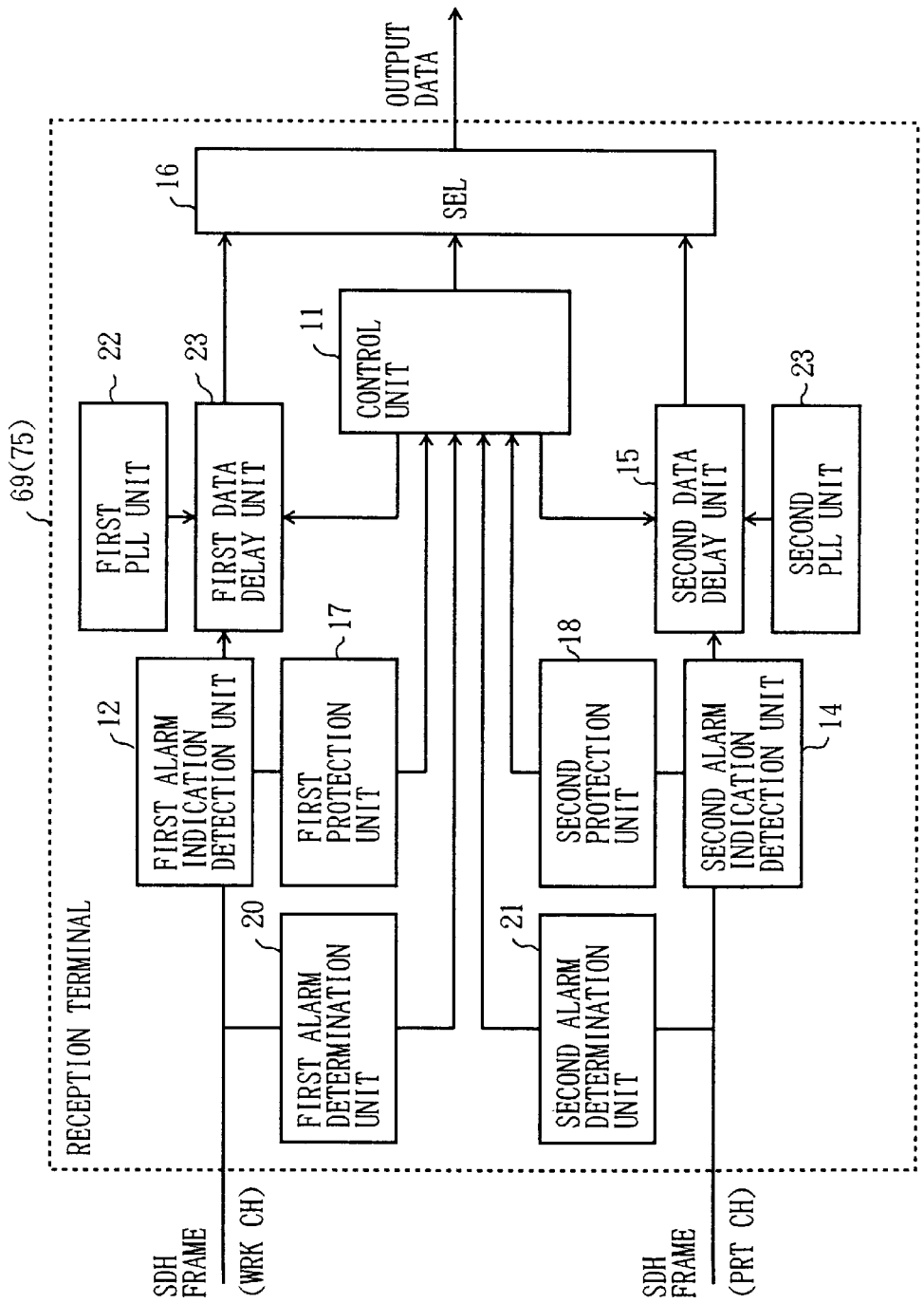
FIG. 5 is a block diagram of basic elements of a reception terminal in another embodiment of the transmission system of the present invention.

FIG. 5 shows basic elements of the reception terminal 69 in the transmission system of the second embodiment. In FIG. 5, the elements which are the same as corresponding elements in FIG. 4 are designated by the same reference numerals, and a description thereof will be omitted.

As shown in FIG. 5, the reception terminal 69 comprises the control unit 11, the first alarm indication detection unit 12, the first data delay unit 13, the second alarm indication detection unit 14, the second data delay unit 15, the selector (SEL) 16, the first protection unit 17, and the second protection unit 18. The operations of these elements are the same as the operations of the corresponding elements in FIG. 4, and a description thereof will be omitted.

In the reception terminal 69 of FIG. 5, a first alarm determination unit 20 and a second alarm determination unit 21 are provided. The first alarm determination unit 20 determines whether the WRK CH has failed based on an operating condition of the WRK CH. When the first alarm determination unit 20 determines that the WRK CH has failed, the first alarm determination unit 20 supplies a signal indicating occurrence of the failure of the WRK CH to the control unit 11 prior to transmission of the data of the SDH frame on the WRK CH.

The second alarm determination unit 21 determines whether the PRT CH has failed based on an operating condition of the PRT CH. When the second alarm determination unit 21 determines that the PRT CH has failed, the second alarm determination unit 21 supplies a signal indicating occurrence of the failure of the PRT CH to the control unit 11 prior to transmission of the data on the PRT CH.

Further, in the reception terminal 69 of FIG. 5, a first phase-locked loop (PLL) unit 22 and a second phase-locked loop (PLL) unit 23 are provided.

The first PLL unit 22 continuously generates a clock on the WRK CH even when the WRK CH has failed due to stopping of a clock supplied on the WRK CH, so as to allow the first data delay unit 13 to continue to output the second SDH frame which is synchronous with the clock generated by the first PLL unit 22.

The second PLL unit 23 continuously generates a clock on the PRT CH even when the PRT CH has failed due to stopping of a clock supplied on the PRT CH, so as to allow the second data delay unit 15 to continue to output the third SDH frame which is synchronous with the clock generated by the second PLL unit 23.

In the second embodiment of the transmission system of FIG. 11, the reception terminal 69 comprises the SF detection unit (SF DET) 44, a data delay unit 70, an alarm determination unit 72, and the FP detection unit (FP DET) 46 which are provided with respect to the working channel line (WRK CH). Further, in the reception terminal 69, a control unit 74 and the selector (SEL) 51 are provided. Further, in the reception terminal 69, the SF detection unit (SF DET) 47, a data delay unit 71, an alarm determination unit 73, and the FP detection unit (FP DET) 49 are provided with respect to the protection channel line (PRT CH).

The SF detection unit 44 receives the SDH frame with the SF byte on the WRK CH from the terminal E, and separates the SF byte from the SDH frame such that the SF detection unit 44 supplies the SF byte to the control unit 74 and supplies the second SDH frame (containing no SF byte) to the data delay unit 70.

The data delay unit 70 provides a delay for the second SDH frame on the WRK CH from the SF detection unit 44. The delay is provided by the data delay unit 70 such that a total delay for the SDH frame on the WRK CH due to the transmission between the terminals A and F and due to the transmission through the data delay unit 70 within the terminal F is always greater than a delay for the SDH frame on the PRT CH due to the transmission between the terminals A and F and due to the transmission through the data delay unit 41 within the terminal B.

The alarm determination unit 72 determines whether the WRK CH has failed based on an operating condition of the WRK CH. When the alarm determination unit 72 determines that the WRK CH has failed, the alarm determination unit 72 supplies a signal indicating occurrence of the failure of the WRK CH to the control unit 74 prior to transmission of the data of the SDH frame on the WRK CH.

The FP detection unit 46 receives the second SDH frame on the WRK CH from the data delay unit 70 and separates the FP from the second SDH frame. The FP detection unit 46 supplies the FP to the control unit 74 and supplies, to the selector 51, the reconstructed SDH frame (containing no FP) which is the same as the SDH frame originally delivered on the WRK CH from the terminal A.

The SF detection unit 47 receives the SDH frame with the SF byte on the PRT CH from the terminal A, and separates the SF byte from the SDH frame such that the SF detection unit 47 supplies the SF byte to the control unit 74 and supplies the second SDH frame (containing no SF byte) to the data delay unit 71.

The data delay unit 71 provides a delay for the second SDH frame on the PRT CH from the SF detection unit 47. The data delay unit 71 is called the elastic memory.

The alarm determination unit 73 determines whether the PRT CH has failed based on an operating condition of the PRT CH. When the alarm determination unit 73 determines that the PRT CH has failed, the alarm determination unit 73 supplies a signal indicating occurrence of the failure of the PRT CH to the control unit 74 prior to transmission of the data on the PRT CH.

The FP detection unit 49 receives the second SDH frame on the PRT CH from the data delay unit 71 and separates the FP from the second SDH frame on the PRT CH. The FP detection unit 49 supplies the FP to the control unit 74 and supplies, to the selector 51, the reconstructed SDH frame (containing no FP) which is the same as the SDH frame originally delivered on the PRT CH from the terminal A.

The control unit 74 receives the FP from the FP detection unit 46 and the FP from the FP detection unit 71, and controls the delay of the data delay unit 71 based on the FP from the FP detection unit 46 such that a position of the FP in the SDH frame on the PRT CH matches with a position of the FP in the SDH frame on the WRK CH. Further, the control unit 74 controls the selector 51 in response to the SF byte from the SF detection unit 44 and the SF byte from the SF detection unit 47, so that the selector 51 outputs a selected one of the SDH frame on the WRK CH from the FP detection unit 46 and the SDH frame on the PRT CH from the FP detection unit 49.

When the SF byte from the SF detection unit 44 indicates the occurrence of the failure of the WRK CH, it is determined that the WRK CH has failed. The control unit 74 switches a connection from the WRK CH to the PRT CH while avoiding instantaneous cutoff by controlling the selector 51 in response to the SF byte from the SF detection unit 44. Similarly, when the SF byte from the SF detection unit 47 indicates the occurrence of the failure of the PRT CH, it is determined that the PRT CH has failed. The control unit 74 switches a connection from the PRT CH to the WRK CH while avoiding instantaneous cutoff by controlling the selector 51 in response to the SF byte from the SF detection unit 47.

The selector 51 outputs the selected one of the SDH frame on the WRK CH from the FP detection unit 46 and the SDH frame on the PRT CH from the FP detection unit 49 as the output data of the terminal F under the control of the control unit 74.

A description will be given of an operation of the transmission system of FIG. 11 when the WRK CH has failed due to a break in the WRK CH, with reference to FIG. 24.

Figure 24:
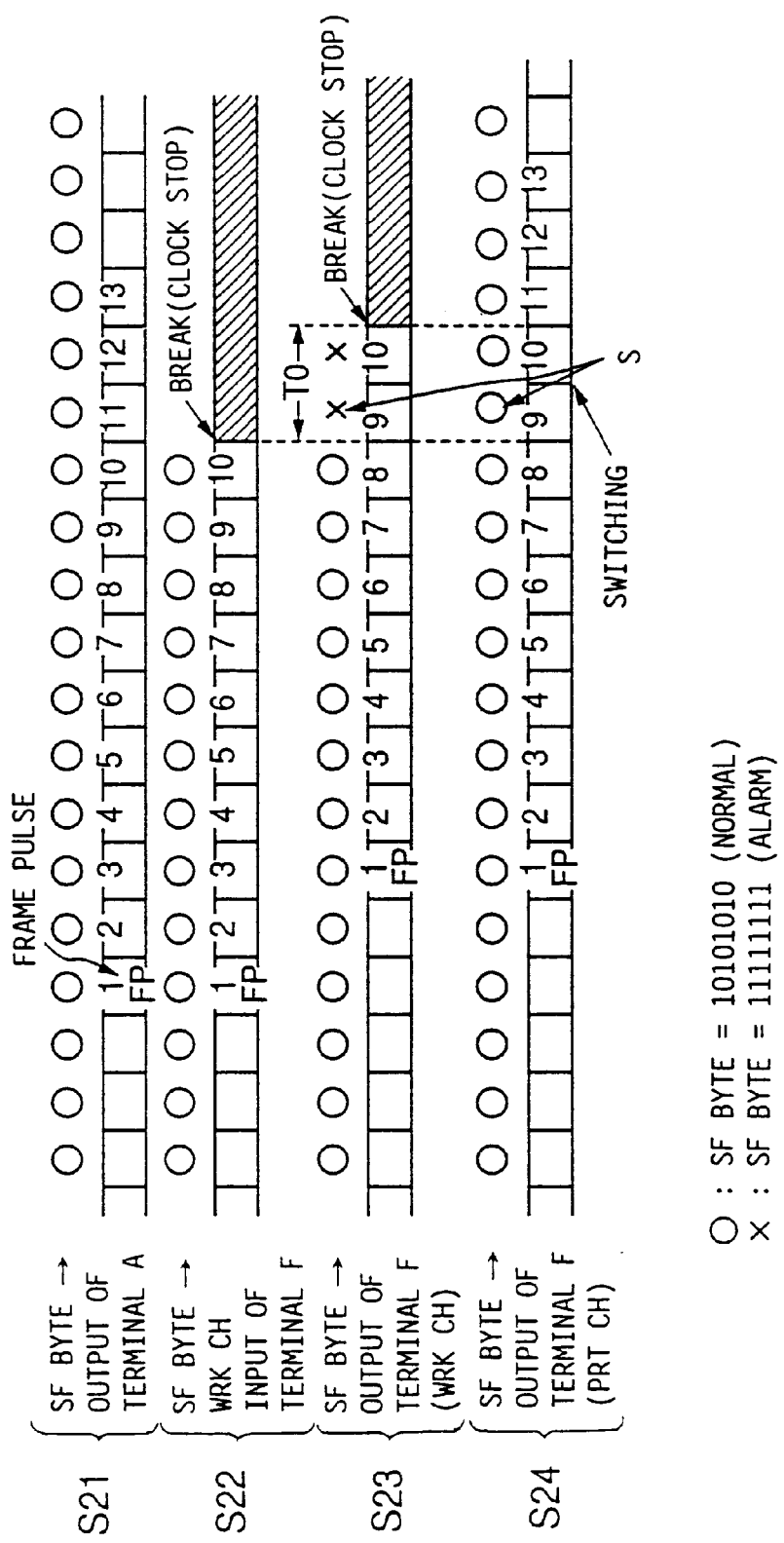
FIG. 24 is a diagram for explaining an operation of the transmission system of the FIG. 11.

FIG. 24 shows the operation of the transmission system of FIG. 11 in such a case. In the transmission system of FIG. 11, a connection is reliably switched from the WRK CH to the PRT CH while avoiding instantaneous cutoff.

In the transmission system of FIG. 11, it is assumed that the data delay units 70 and 71 of the terminal F equally provide a delay "T0" for the SDH frame on the related channel line.

When the WRK CH has failed due to a break in the WRK CH at a position "A" between the terminals A and F as indicated in FIG. 11, the SF insertion unit 37 in the terminal A receives the SDH frame and inserts an SF byte (="11111111") in the SDH frame at the given location of the SDH frame. The SF insertion unit 37 at this time writes the SF byte to the SDH frame, the content of the SF byte indicating that the WRK CH has failed.

The FP insertion unit 38 in the terminal A inserts the frame pulse (FP) in the SDH frame at the given location of the head of the payload signal. The FP in the SDH frame is used by the reception terminal 69 (the terminal F) to synchronize the head of the payload signal on the WRK CH with the head of the payload signal on the PRT CH.

The distribution unit 39 in the terminal A supplies the SDH frame containing the SF byte and the FP to both the PRT CH input and the WRK CH input of the reception terminal 69. The signal on the WRK CH at the output of the terminal A is indicated by "S21" in FIG. 24.

The SF detection unit 47 in the terminal F receives the SDH frame with the SF byte on the PRT CH from the terminal A and separates the SF byte from the SDH frame. The SF detection unit 47 at this time supplies the SF byte to the control unit 74, and deletes the SF byte in the SDH frame to supply the second SDH frame (containing no SF byte) to the data delay unit 71. The SF detection unit 44 in the terminal F receives the SDH frame with the SF byte on the WRK CH from the terminal A and separates the SF byte from the SDH frame. The SF detection unit 44 at this time supplies the SF byte to the control unit 74, and deletes the SF byte in the SDH frame to supply the second SDH frame (containing no SF byte) to the data delay unit 70.

The signal on the WRK CH at the input of the terminal F is indicated by "S22" in FIG. 24. As indicated by "S22" in FIG. 24, after the WRK CH has failed due to the break at the position "A" between the terminals A and F, the terminal F does not subsequently receive the SDH frame with the SF byte on the WRK CH from the terminal A.

In the example of FIG. 24, the break in the WRK CH at the position "A" has occurred during transmission of the 11th SDH frame by the terminal A. The alarm determination unit 72 in the terminal F determines that the WRK CH has failed based on the operating condition of the WRK CH from the terminal A. In the terminal F, the alarm determination unit 72 supplies a signal indicating the occurrence of the failure of the WRK CH to the control unit 74 prior to transmission of data of the SDH frame on the WRK CH. When it is determined that the WRK CH has failed, the SF detection unit 44 supplies the SF byte (="11111111") to the control unit 74, and deletes the SF byte in the SDH frame to supply the second SDH frame (containing no SF byte.) to the data delay unit 70.

The data delay unit 70 in the terminal F provides the delay "T0" for the second SDH frame on the WRK CH from the SF detection unit 44. The signal on the WRK CH at the output of the terminal F and the signal on the PRT CH at the output of the terminal F are indicated by "S23" and "S24" in FIG. 24.

In the present embodiment, after the WRK CH has failed due to the break at the position "A" between the terminals A and F, the SDH frame (or the 9th and 10th SDH frames) stored in the data delay unit 70 of the terminal F can be transmitted on the WRK CH from the terminal F.

Specifically, in the example of FIG. 24, when the break has occurred during the transmission of the 11th SDH frame, the SF insertion unit 37 of the terminal A inserts the SF byte (="11111111") in the 9th and 10th SDH frames respectively, and the terminal F supplies these SDH frames with the SF byte. As indicated by "S23" in FIG. 24, the terminal F continuously transmits the SDH frames with the SF byte (="11111111") on the WRK CH during a period of time from the occurrence of the break in the WRK CH to the end of the delay "T0" by the data delay units 70 of the terminal F. The terminal F switches the connection from the WRK CH to the PRT CH while avoiding instantaneous cutoff within the period "T0".

At the same time, as indicated by "S24" in FIG. 24, the SF detection unit 47 in the terminal F receives the SDH frame with the SF byte (="10101010") on the PRT CH from the terminal A, and separates the SF byte from the SDH frame. If the PRT CH normally functions, the SF detection unit 47 supplies the SF byte (="10101010") to the control unit 74, and deletes the SF byte in the SDH frame to supply the second SDH frame (containing no SF byte) to the data delay unit 71.

The data delay unit 71 in the terminal F provides the delay for the second SDH frame on the PRT CH. The FP detection unit 49 supplies the FP to the control unit 74 and deletes the FP in the SDH frame to supply the reconstructed SDH frame to the selector 51. The control unit 74 controls the delay of the data delay unit 71 based on the FP from the FP detection unit 46 such that the position of the FP in the SDH frame on the PRT CH matches with the position of the FP in the SDH frame on the WRK CH.

As indicated by "S" in FIG. 24, the control unit 74 receives the SF byte (="11111111") from the SF detection unit 44 and the SF byte (="10101010") from the SF detection unit 47 upon the occurrence of the break in the WRK CH at the position "A". It is determined that the WRK CH has failed but the PRT CH normally functions. As indicated by "S23" and "S24" in FIG. 24, within the period "T0", the control unit 74 controls the selector 51 to switch the connection from the WRK CH to the PRT CH while avoiding instantaneous cutoff, so that the selector 51 outputs the SDH frame on the PRT CH from the FP detection unit 49 as the output data of the terminal F. In the transmission system of FIG. 11, the SDH frame on the PRT CH at this time is synchronous with the SDH frame on the WRK CH, and the switching is performed within the period "T0". Therefore, it is possible to avoid instantaneous cutoff.

Figure 12:
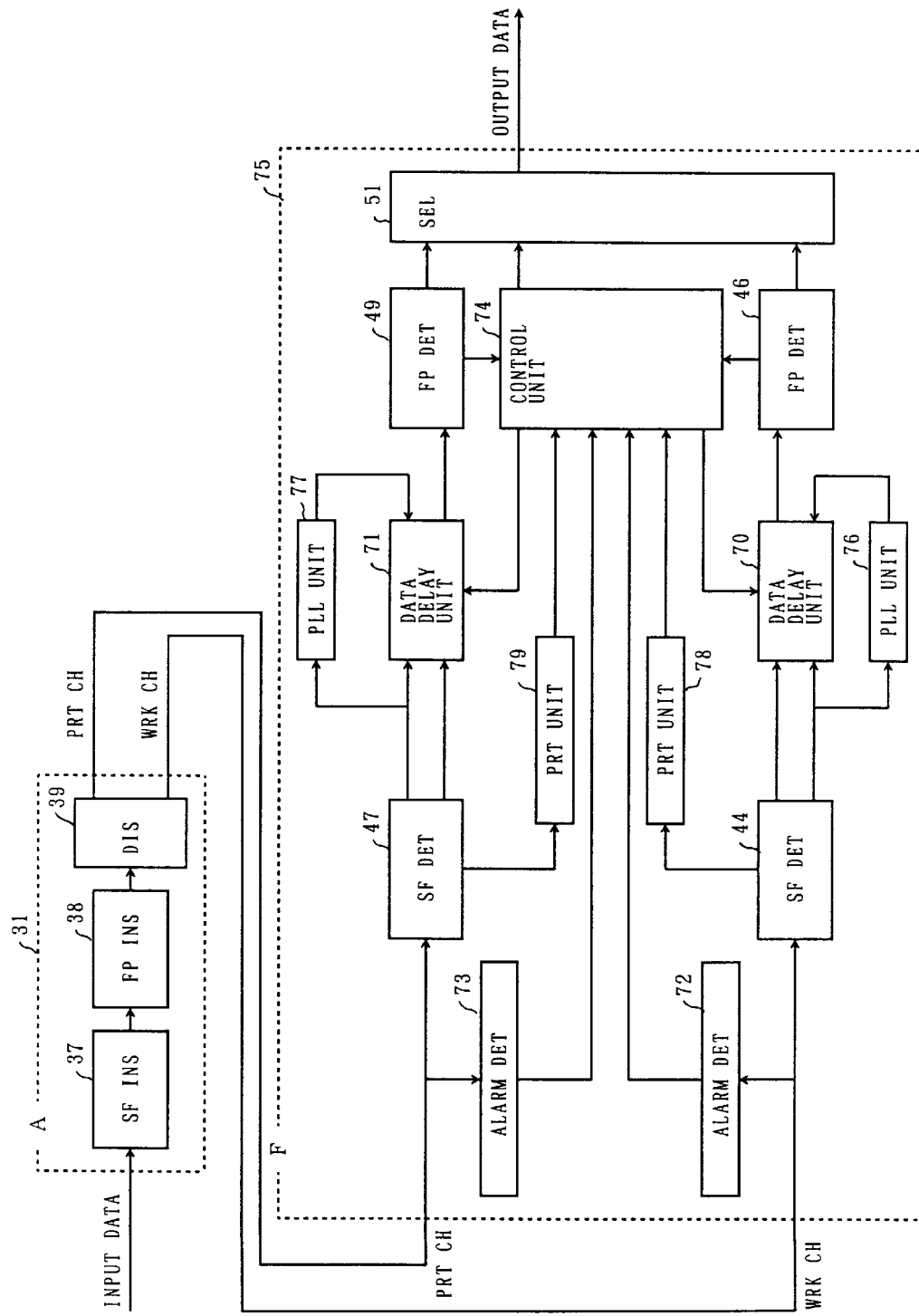
FIG. 12 is a block diagram of a modification of the transmission system of FIG. 11.

FIG. 12 shows a modification of the transmission system of FIG. 11. In FIG. 12, the elements which are the same as corresponding elements in FIG. 11 are designated by the same reference numerals, and a description thereof will be omitted.

In the embodiment of the transmission system of FIG. 12, a reception terminal 75 is substituted for the reception terminal 69 in the transmission system of FIG. 11.

In the reception terminal 75 of FIG. 12, the SF detection unit 44, the data delay unit 70, the FP detection unit 46, the SF detection unit 47, the data delay unit 71, the FP detection unit 49, the control unit. 74, the selector 51, the alarm determination unit 72, the alarm determination unit 73, a protection unit (PRT UNIT) 78, and a protection unit (PRT UNIT) 79 are provided.

In the present embodiment, the protection unit 78 is provided between the SF detection unit 44 and the control unit 74 to prevent a noise from being supplied to the control unit 74 when the SF byte from the SF detection unit 44 is supplied to the control unit 74. The protection unit 79 is provided between the SF detection unit 47 and the control unit 74 to prevent a noise from being supplied to the control unit 74 when the SF byte from the SF detection unit 47 is supplied to the control unit 74.

If the noise is received by the control unit 74 with the SF byte from the SF detection unit 44 or the SF byte from the SF detection unit 47, the control unit 74 may perform an erroneous switching of the connection. By the use of the protection units 78 and 79 in the reception terminal 75, it is possible for the transmission system of the present embodiment to prevent an erroneous switching from being performed due to the noise. It is possible to provide increased reliability for data communication in the transmission system.

Further, in the reception terminal 75 of the transmission system of FIG. 12, a phase-locked loop (PLL) unit 76 and a phase-locked loop (PLL) unit 77 are provided.

The PLL unit 76 continuously generates a clock on the WRK CH even when the WRK CH has failed due to stopping of a clock supplied on the WRK CH, so as to allow the data delay unit 70 to continue to output the second SDH frame which is synchronous with the clock generated by the PLL unit 76.

The PLL unit 77 continuously generates a clock on the PRT CH even when the PRT CH has failed due to stopping of a clock supplied on the PRT CH, so as to allow the data delay unit 71 to continue to output the third SDH frame which is synchronous with the clock generated by the PLL unit 77.

In the transmission system of FIG. 12, by the use of the PLL units 76 and 77 in the reception terminal 75, it is possible to reliably switch a connection from one of the WRK CH and the PRT CH to the other while avoiding instantaneous cutoff when one of the WRK CH and the PRT CH has failed due to stopping of a clock supplied on the related channel line.

An operation of the transmission system of FIG. 12 when the WRK CH has failed due to stopping of the clock supplied on the WRK CH is essentially the same as the operation of the transmission system of FIG. 11 when the WRK CH has failed due to a break in the WRK CH (previously described with reference to FIG. 24), and a description thereof will be omitted.

Figure 13:
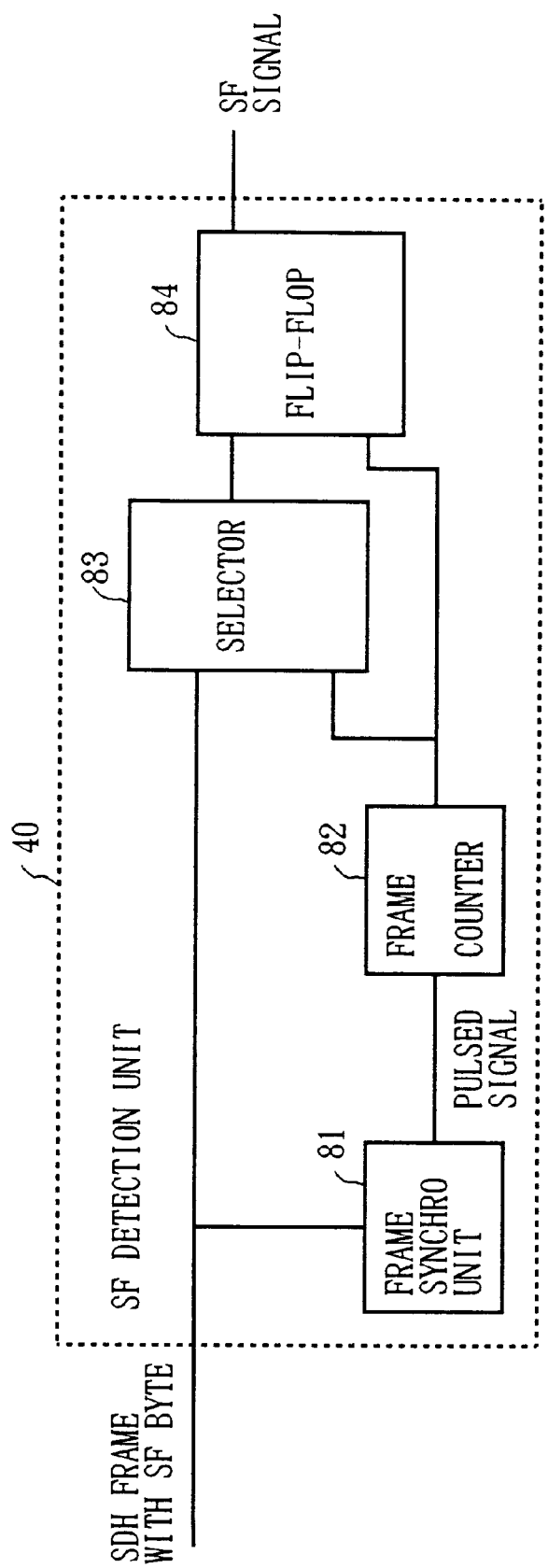
FIG. 13 is a block diagram of an SF detection unit in the transport terminal.

Next, FIG. 13 shows a construction of the SF detection unit 40 in the transport terminal 32 of the first embodiment of the transmission system of FIG. 1. The SF detection unit 44 and the SF detection 47 in the reception terminal 36 and the corresponding elements of the other embodiments have a construction that is essentially the same as the construction of SF detection unit of FIG. 13, and a description will be omitted.

As shown in FIG. 13, the SF detection unit 40 includes a frame sync unit 81, a frame counter 82, a selector 83, and a flip-flop 84. The frame sync unit 81 generates a pulsed signal which is synchronous with the SDH frame on the related channel line input to the transport terminal 32. The frame counter 82 counts the pulsed signal from the frame sync unit 81 and generates a pulse signal which is synchronous with the position of the SF byte in the SDH frame.

Figure 14:
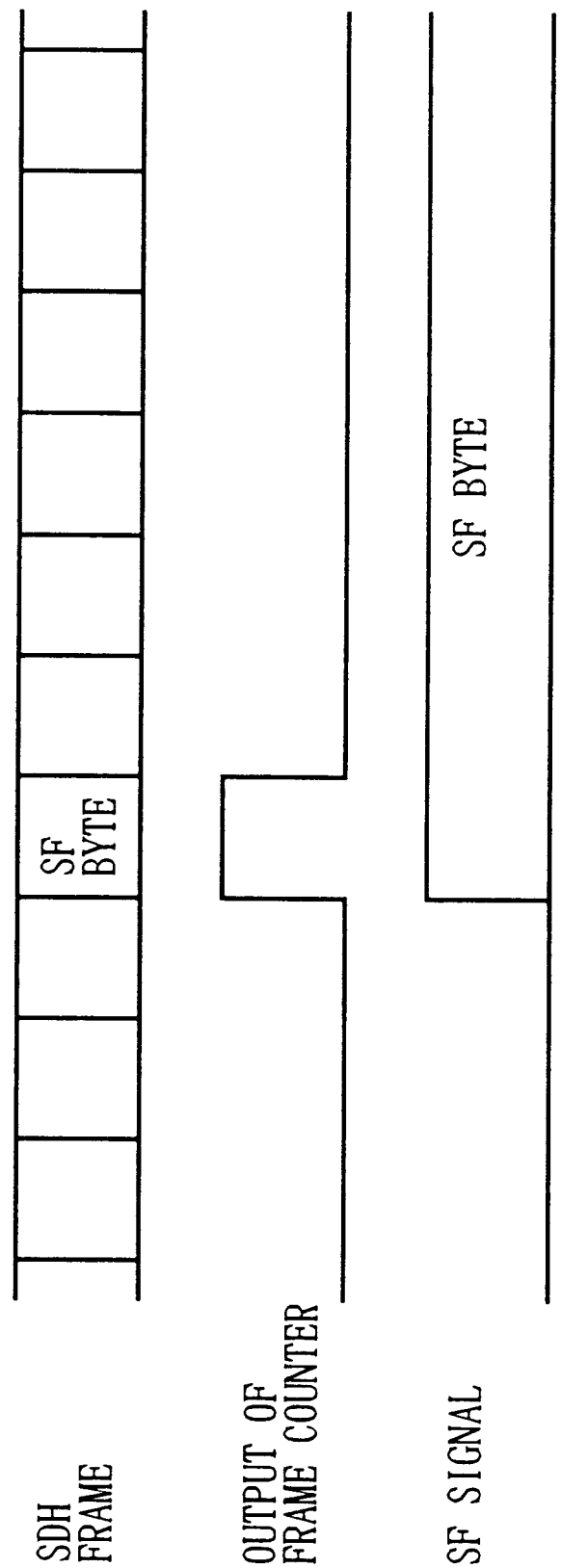
FIG. 14 is a time chart for explaining an operation of the SF detection unit of FIG. 13.

FIG. 14 shows an operation of the SF detection unit of FIG. 13.

As shown in FIG. 14, the SDH frame with the SF byte is input to the SF detection unit 40 on the related channel line. The frame sync unit 81 generates a pulsed signal which is synchronous with the input SDH frame. The frame counter 82 counts the pulsed signal from the frame sync unit 81. The frame counter 82 generates a pulse signal which is set in a high state in a synchronous manner with the position of the SF byte in the SDH frame when the number of pulses counted by the frame counter 82 reaches a given number.

In the SF detection unit 40, the selector 83 receives the SDH frame and the pulse signal output by the frame counter 82. When the pulse signal from the frame counter 82 is in the high state, the selector 83 outputs an SF signal indicating the SF byte in the SDH frame. The flip-flop 84 receives the pulse signal output by the frame counter 82 and retains the SF signal output by the selector 83. When the pulse signal from the frame counter 82 is in the high state, the flip-flop 84 outputs the SF signal in a synchronous manner with the position of the SF byte in the SDH frame.

Figure 15:
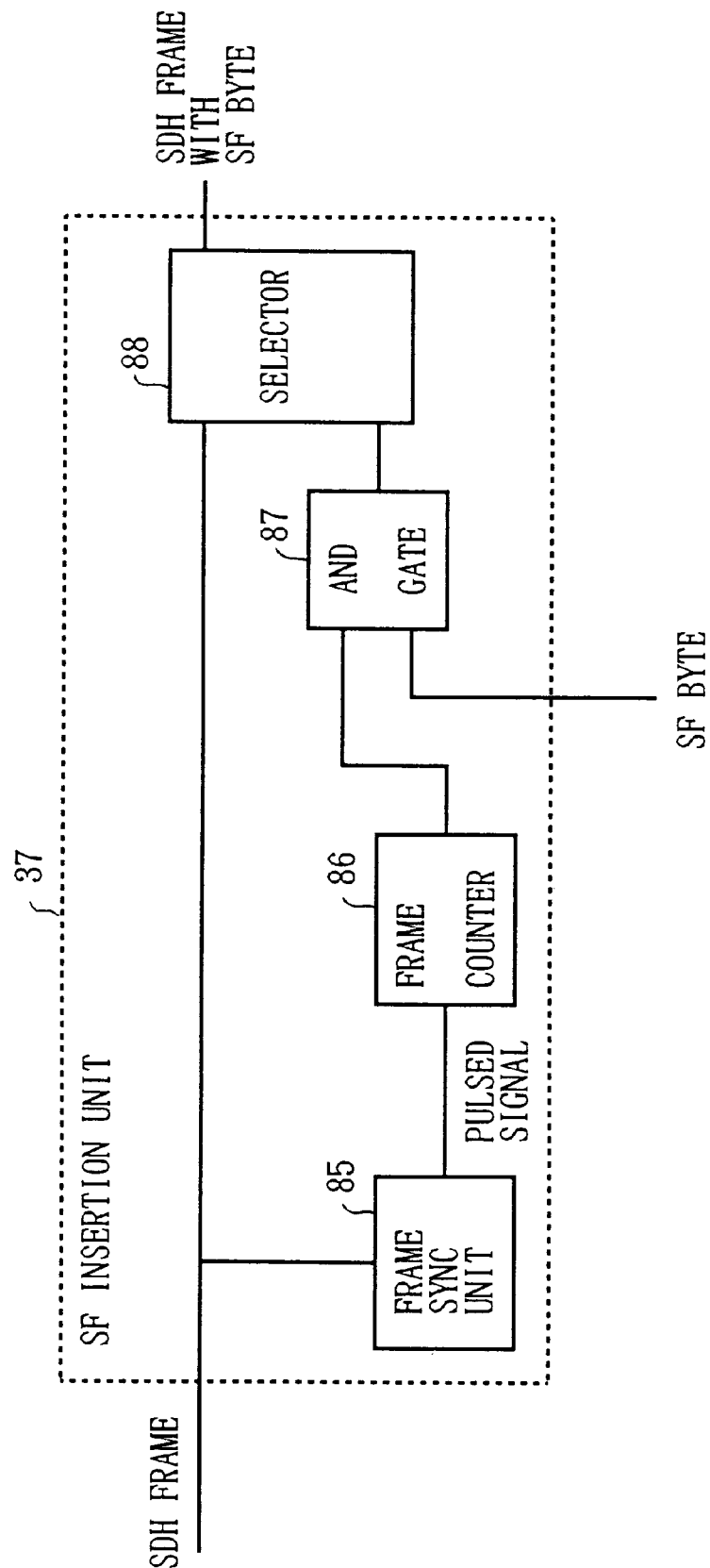
FIG. 15 is a block diagram of an SF insertion unit in the transmission terminal.

FIG. 15 shows a construction of the SF insertion unit 37 in the transmission terminal 31 of the first embodiment of the transmission system of FIG. 1. The SF insertion unit 42 in the transport terminal 32 and the corresponding elements of the other embodiments have a construction that is essentially the same as the construction of the SF insertion unit 37 of FIG. 15, and a description will be omitted.

As shown in FIG. 15, the SF insertion unit 37 includes a frame sync unit 85, a frame counter 86, an AND gate 87, and a selector 88. The frame sync unit 85 generates a pulsed signal which is synchronous with the SDH frame on the related channel line input to the transmission terminal 31. The frame counter 86 counts the pulsed signal from the frame sync unit 85 and generates a timing signal which is synchronous with the position of the SF byte to be inserted in the SDH frame. The SF insertion unit 37 inserts the SF byte in the SDH frame input to the transmission terminal 37. As shown in FIG. 15, the SF byte containing the alarm indication to indicate whether the related channel line has failed is externally supplied to the AND gate 87.

Figure 16:
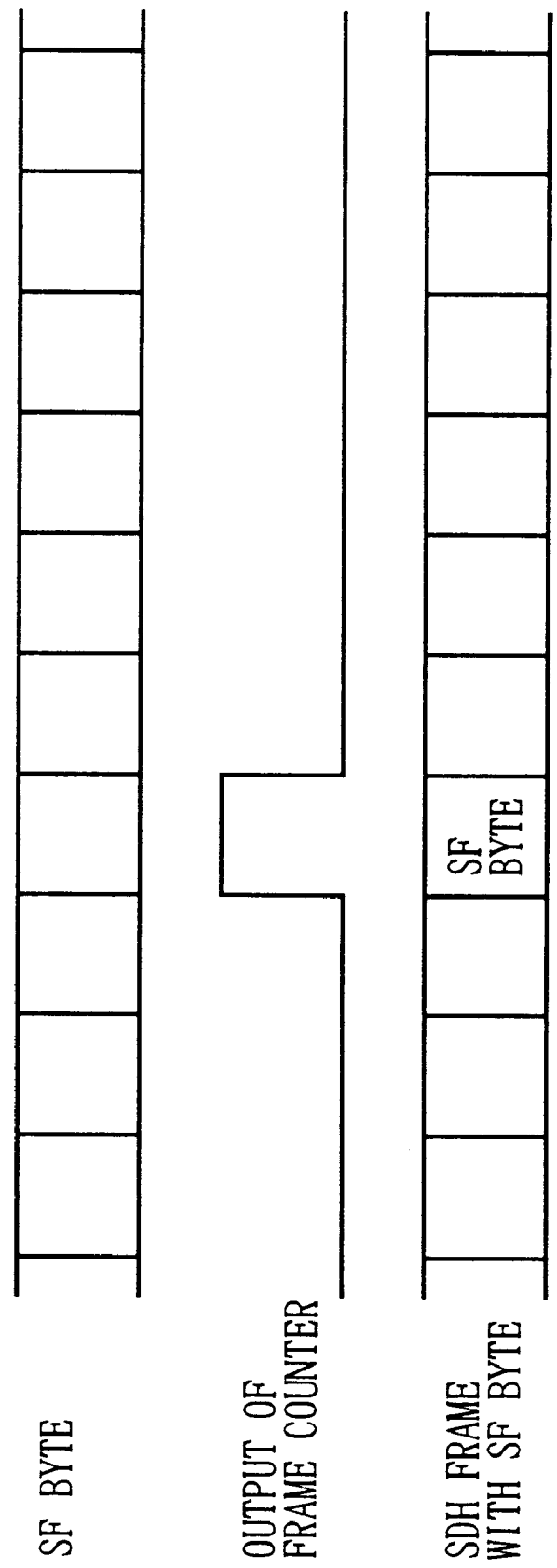
FIG. 16 is a time chart for explaining an operation of the SF insertion unit of FIG. 15.

FIG. 16 shows an operation of the SF insertion unit 37 of FIG. 15.

As shown in FIG. 16, the SDH frame is input to the SF insertion unit 37. The frame sync unit 85 generates a pulsed signal which is synchronous with the SDH frame. The frame counter 86 counts the pulsed signal from the frame sync unit 85, and outputs a timing signal which is set in a high state in a synchronous manner with a given position of the SF byte in the SDH frame when the number of pulses counted by the frame counter 86 reaches a given number.

In the SF insertion unit 37, the AND gate 87 receives the SF byte and the timing signal output by the frame counter 86. When the timing signal from the frame counter 86 is in the high state, the AND gate 87 outputs an SF signal indicating the SF byte to be inserted in the SDH frame. The selector 88 receives the SDH frame and the SF signal output by the AND gate 87. When the SF signal is output by the AND gate 87, the selector 88 outputs the SF signal in a synchronous manner with the position of the SF byte in the SDH frame. Otherwise the selector 88 outputs the SDH frame to the SF insertion unit 37. Therefore, the SF insertion unit 37 inserts the SF byte in the SDH frame input to the SF insertion unit 37, and outputs the SDH frame with the SF byte.

Figure 17:
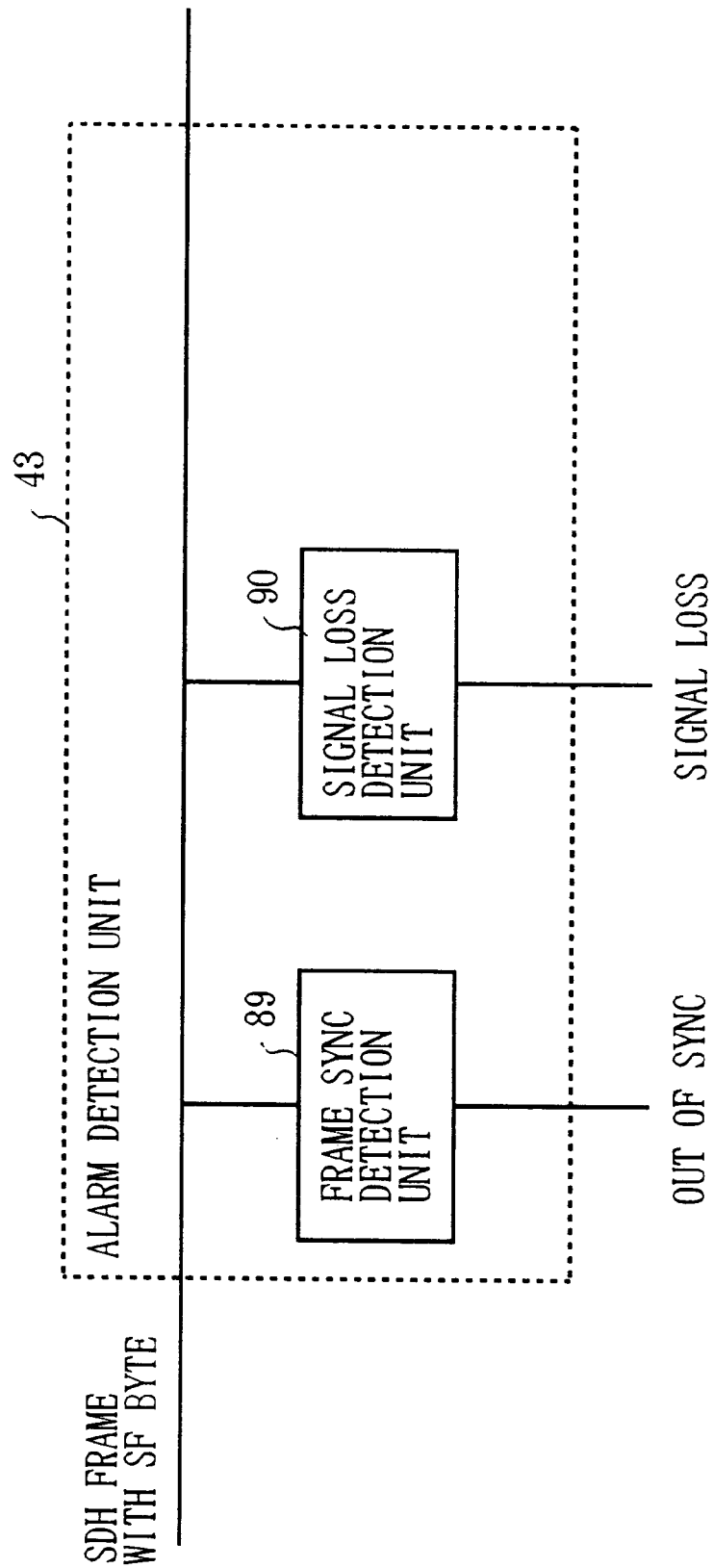
FIG. 17 is a block diagram of an alarm determination unit in the transport terminal.

FIG. 17 shows a construction of the alarm determination unit 43 in the transport terminal 32. The alarm determination unit 73 and the alarm determination unit 72 in the reception terminal 69 of FIG. 11 and the corresponding elements of the other embodiments have a construction which is essentially the same as the construction of the alarm determination unit 43 of FIG. 17, and a description thereof will be omitted.

As shown in FIG. 17, the alarm determination unit 43 includes a frame sync detection unit 89 and a signal loss detection unit 90. The frame sync detection unit 89 receives the SDH frame with the SF byte on the related channel line and generates a pulsed signal synchronous with the SDH frame. The frame sync detection unit 89 detects a shift or deviation of the SDH frame with respect to the pulsed signal, the shift indicating whether the SDH frame on the related channel line is out of synchronization. The frame sync detection unit 89 determines whether the related channel line has failed based on the operating condition of the related channel line. When the out-of-sync shift of the SDH frame is detected by the frame sync detection unit 89, it is determined that the clock on the related channel line has stopped or the related channel line has failed.

In the alarm determination unit 43 of FIG. 17, the signal loss detection unit 90 receives the SDH frame with the SF byte on the related channel line input to the transport terminal 32, and detects a signal loss on the related channel line. When the signal loss is detected by the signal loss detection unit 90, it is determined that a break in the related channel line has occurred.

Figure 18:
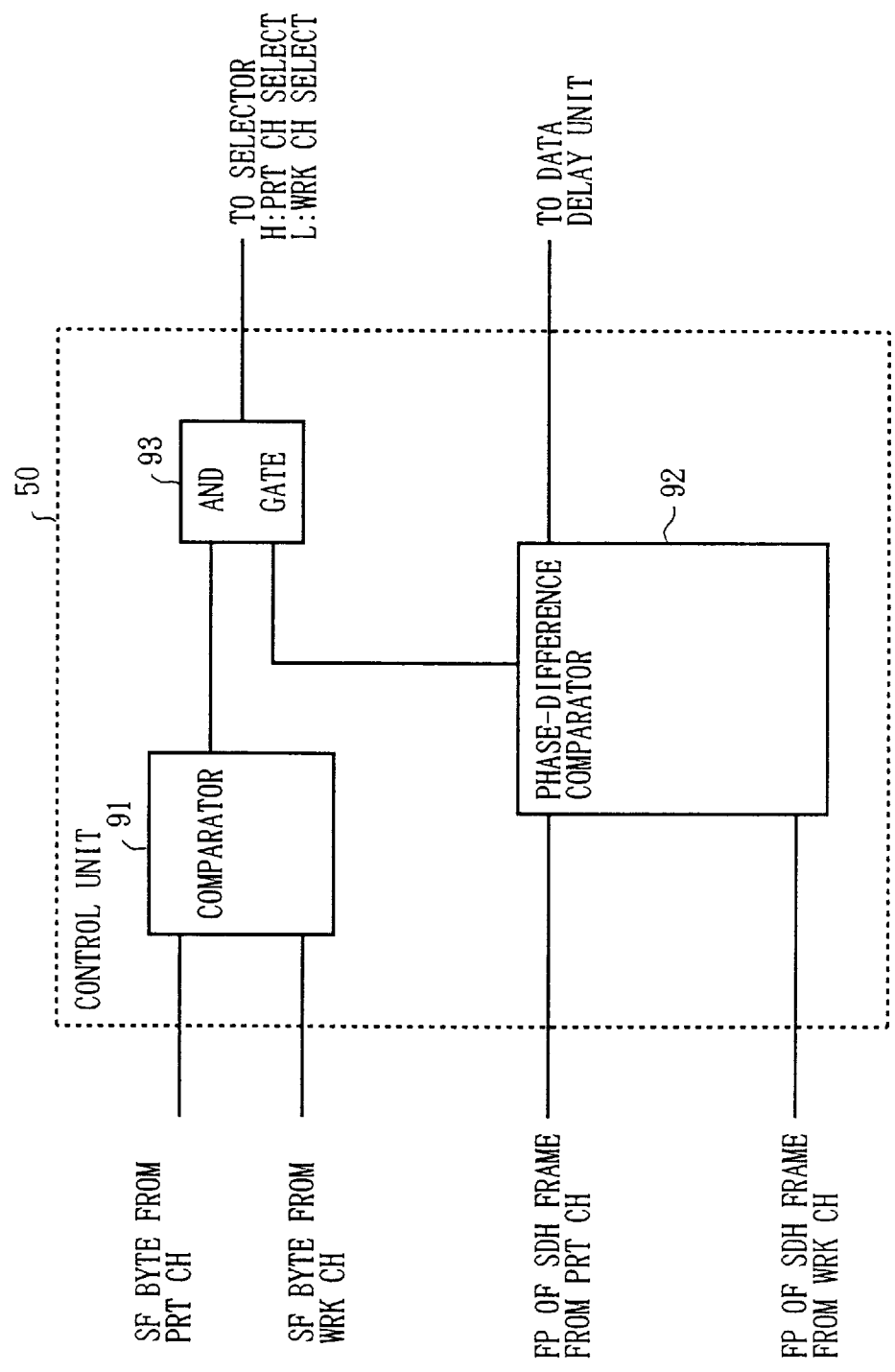
FIG. 18 is a block diagram of a control unit in the reception terminal.

FIG. 18 shows a construction of the control unit 50 in the reception terminal 36. The control unit 74 in the reception unit 69 of FIG. 11 and the corresponding elements of the other embodiments have a construction which is essentially the same as the construction of the control unit 50 of FIG. 18, and a description thereof will be omitted.

As shown in FIG. 18, the control unit 50 includes a comparator 91, a phase difference comparator 92 and an AND gate 93.

In the control unit 50 of FIG. 18, the comparator 91 compares the SF byte from the protection channel line with the SF byte from the working channel line, and outputs either a high-state signal or a low-state signal to the AND gate 93 based on the result of the comparison. The AND gate 93 outputs a control signal to select one of the working channel line and the protection channel line, to the selector 51.

The phase-difference comparator 92 compares a phase of the FP in the SDH frame from the protection channel line with a phase of the FP in the SDH frame from the working channel line, and outputs a control signal to the data delay unit 48 based on the result of the comparison, so as to control the delay provided for the SDH frame on the protection channel line by the data delay unit 110. The outputting of the control signal to the data delay unit 48 makes the position of the FP in the SDH frame on the protection channel line match with the position of the FP in the SDH frame on the working channel line.

FIG. 19 shows an operation of the comparator 91 of the control unit of FIG. 18.

As shown in FIG. 19, the comparator 91 outputs the low-state signal ("L") to the AND gate 93 when the SF byte from the protection channel line is in the high state ("H") and the SF byte from the working channel line is in the low state ("L"). The comparator 91 outputs the high-state signal ("H") to the AND gate 93 when the SF byte from the protection channel line is in the low-state ("L") and the SF byte from the working channel line is in the high-state ("H"). When the SF bytes are in the high state ("H") or in the low state ("L"), the output signal of the comparator 91 is retained as being the same as the previous state signal.

In the control unit 50 of FIG. 18, when the phase of the FP in the SDH frame from the protection channel line does not match with the phase of the FP in the SDH frame from the working channel line as the result of the comparison by the phase-difference comparator 92, the phase-difference comparator 92 outputs a control signal to the data delay unit 48 so as to synchronize the phase of the FP in the SDH frame from the protection channel line with the phase of the FP in the SDH frame from the working channel line.

When the phase of the FP in the SDH frame from the protection channel line matches with the phase of the FP in the SDH frame from the working channel line, the phase-difference comparator 92 outputs a high-state signal to the AND gate 93. In this case, if the low-state signal from the comparator 91 is supplied to the AND gate 93, the AND gate 93 outputs a low-state signal ("L") to the selector 51 which indicates the selection of the connection of the reception terminal 36 with the working channel line. If the high-state signal from the comparator 91 is supplied to the AND gate 93, the AND gate 93 outputs a high-state signal ("H") to the selector 51 which indicates the selection of the connection of the reception terminal 36 with the protection channel line.

Figure 20:
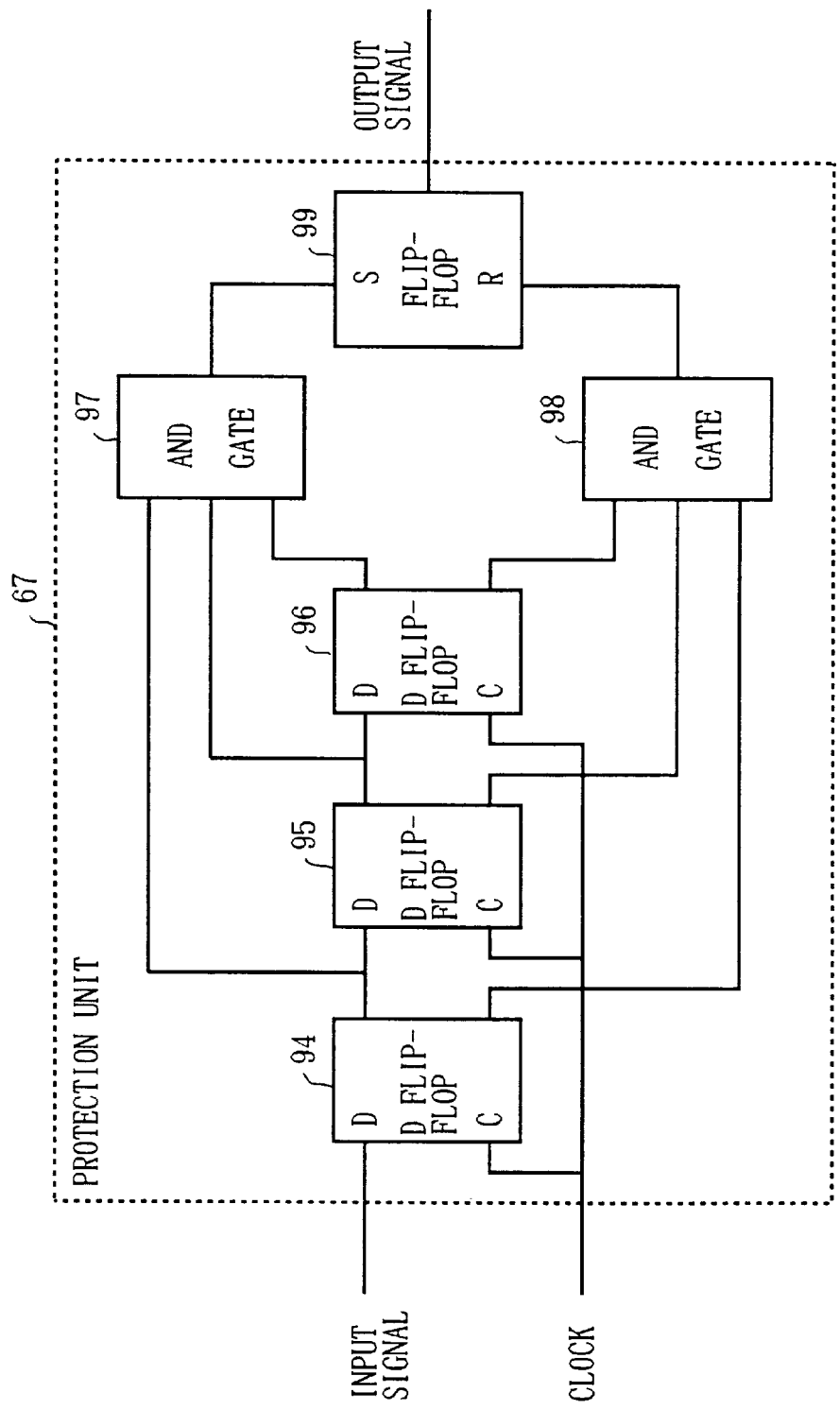
FIG. 20 is a block diagram of a protection unit in the reception terminal.

FIG. 20 shows a construction of the first protection unit 67 in the reception terminal 66 of FIG. 9. The second protection unit 68 in the reception terminal 66 of FIG. 9 and the protection units 78 and 79 in the reception terminal 75 of FIG. 12 and the corresponding elements of the other embodiments have a construction which is essentially the same as the construction of the protection unit 67 of FIG. 20, and a description thereof will be omitted.

As shown in FIG. 20, the protection unit 67 comprises a D flip-flop 94, a D flip-flop 95, a D flip-flop 96, an AND gate 97, an AND gate 98, and a flip-flop 99. The protection unit 67 prevents a noise from being supplied to the control unit 50 when the SF byte from the SF detection unit 44. is supplied to the control unit 50 in order to avoid performing an erroneous switching due to the noise.

Figure 21:
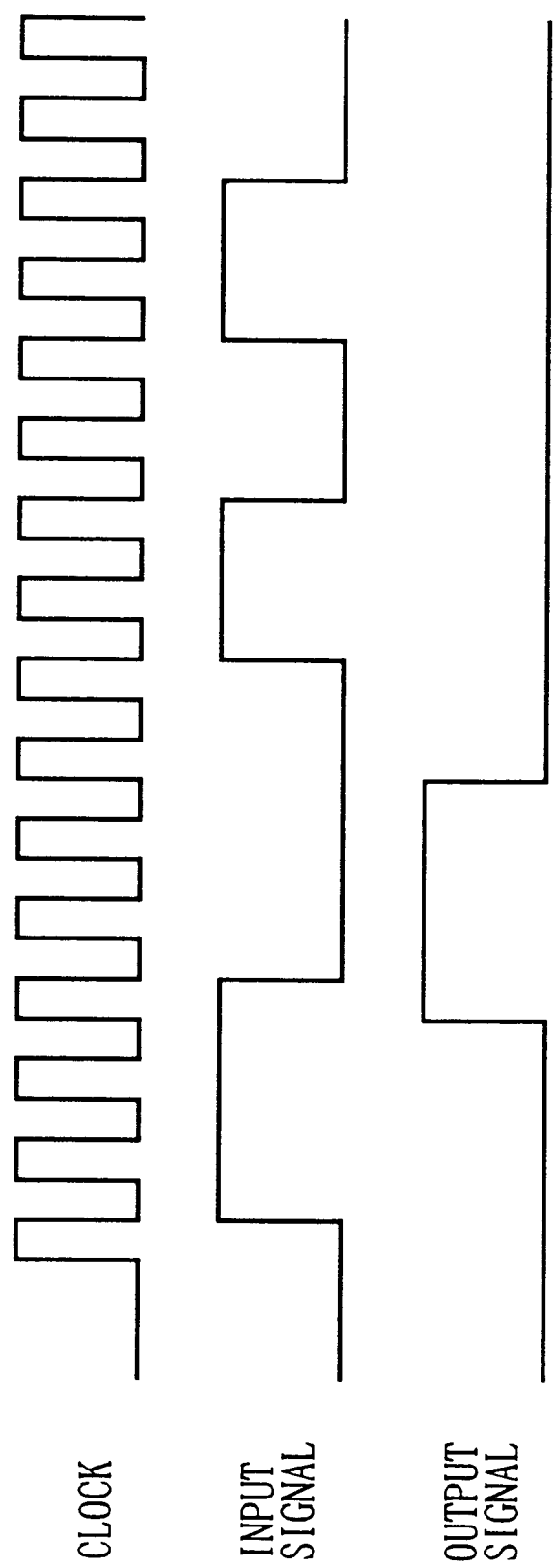
FIG. 21 is a time chart for explaining an operation of the protection unit of FIG. 20.

FIG. 21 shows an operation of the protection unit 67 of FIG. 20. As shown in FIG. 20, in the protection unit 67, an input signal is supplied to the D flip-flop 94, the D flip-flop 95 and the D flip-flop 96 in a serial manner. A clock is supplied to the D flip-flops 94–96 in a parallel manner. Each of the D flip-flops 94, 95 and 96 outputs a high-state signal to the AND gate 97 and outputs a low-state signal to the AND gate 98. When the clock at the input of each D flip-flop is on the rising edge, the D flip-flops 94–96 supply the high-state or low-state signals in response to the input signal.

When all the D flip-flops 94–96 output the high-state signals to the AND gate 97, the AND gate 97 outputs a high-state signal to set the flip-flop 99 so that the flip-flop 99 supplies a high-state signal as the output signal of the protection unit 67. When all the D flip-flops 94–96 output the low-state signals to the AND gate 98, the AND gate 98 outputs a low-state signal to reset the flip-flop 99 so that the flip-flop 99 supplies a low-state signal as the output signal of the protection unit 67.

As shown in FIG. 21, the output signal of the protection unit 67 changes from the high state to the low state or vice versa only when the input signal of the protection unit 67 continues to be in the same state over a period of three clocks. Otherwise the output signal of the protection unit 67 remains unchanged. Therefore, in the protection unit 67 of FIG. 20, if the input signal does not continue to be in the same state over the period of three clocks, it is determined that the signal is a noise. The protection unit 67 prevents the supplying of the noise to the control unit 50.

Further, the present invention is not limited to the above-described embodiments, and variations and modifications may be made without departing from the present invention.

What is claimed is:

1. A transmission system for transmitting data of a synchronous digital hierarchy SDH frame, wherein the transmission system includes a plurality of terminals linked by a working channel line and a protection channel line in a redundant structure, said transmission system comprising:

a transmission terminal;

at least one transport terminal linked with the transmission terminal by one of the working channel line and the protection channel line; and a reception terminal linked with the transmission terminal by the working channel line and the protection channel line via said at least one transport terminal, each of said transmission terminal and said at least one transport terminal comprising an alarm indication insertion unit for inserting an alarm indication in the SDH frame at a given location of the SDH frame, the alarm indication indicating whether a related channel line has failed, the SDH frame containing the alarm indication being transmitted to the reception terminal prior to transmission of the data on the related channel line, and said reception terminal comprising
a control unit for outputting a selected one of the SDH frame on the working channel line and the SDH frame on the protection channel line in response to the alarm indication received by the control unit, wherein, when one of the working channel line and the protection channel line has failed, said control unit switches a connection from said one of the working channel line and the protection channel line to the other while avoiding instantaneous cutoff.

2. The transmission system according to claim 1, wherein said transmission terminal comprises a frame pulse insertion unit for inserting a frame pulse in the SDH frame at a given location of a head of a payload signal, the frame pulse indicating a reference position in the SDH frame on a related channel line and being used to synchronize the head of the payload signal on the working channel line with the head of the payload signal on the protection channel line.

3. The transmission system according to claim 2, wherein said transmission terminal further comprises a distribution unit for supplying the SDH frame containing the alarm indication and the frame pulse to both the, working channel line and the protection channel line.

4. The transmission system according to claim 1, wherein said at least one transport terminal comprises an alarm determination unit for determining whether a related channel line has failed based on an operating condition of the related channel line, wherein, when the alarm determination unit determines that the related channel line has failed, the alarm determination unit supplies a signal indicating occurrence of the failure of the related channel line prior to transmission of the data on the related channel line.

5. The transmission system according to claim 4, wherein said at least one transport terminal further comprises:
an alarm indication detection unit for separating the alarm indication from the SDH frame from the transmission terminal to separately supply the alarm indication and a first SDH frame containing no alarm indication;
a data delay unit for providing a delay for the first SDH frame from the alarm indication detection unit; and
an alarm indication insertion unit for inserting the alarm indication from the alarm indication detection unit into the first SDH frame from the data delay unit, so that the alarm indication insertion unit supplies a reconstructed SDH frame containing the alarm indication to the reception terminal prior to transmission of the data on the related channel line.

6. The transmission system according to claim 5, wherein said at least one transport terminal further comprises a phase-locked loop unit for continuously generating a clock on the related channel line even when the related channel line has failed due to stopping of a clock supplied on the related channel line, so as to allow the data delay unit to continuously supply, to the alarm indication insertion unit, the first SDH frame synchronous with the clock generated by the phase-locked loop unit.

7. The transmission system according to claim 1, wherein said reception terminal further comprises:
a first alarm indication detection unit for separating the alarm indication from the SDH frame on the working channel line from said at least one transport terminal to separately supply the alarm indication and a second SDH frame containing no alarm indication;
a first data delay unit for providing a delay for the second SDH frame on the working channel line from the first alarm indication detection unit;
a first frame pulse detection unit for separating a frame pulse from the second SDH frame on the working channel line from the first data delay unit to separately supply the frame pulse and a reconstructed SDH frame containing no frame pulse which is the same as the SDH frame originally on the working channel line from the transmission terminal;
a second alarm indication detection unit for separating the alarm indication from the SDH frame on the protection channel line from said at least one transport terminal to separately supply the alarm indication and a third SDH frame containing no alarm indication;
a second data delay unit for providing a delay for the third SDH frame on the protection channel line from the second alarm indication detection unit; and
a second frame pulse detection unit for separating a frame pulse from the third SDH frame on the protection channel line from the second data delay unit to separately supply the frame pulse and a reconstructed SDH frame containing no frame pulse which is the same as the SDH frame originally on the protection channel line from the transmission terminal,
wherein the control unit receives the frame pulse from the first frame pulse detection unit and the frame pulse from the second frame pulse detection unit, and controls the delay of the second data delay unit based on the frame pulse from the first frame pulse detection unit such that a position of the frame pulse in the SDH frame on the protection channel line matches with a position of the frame pulse in the SDH frame on the working channel line.

8. The transmission system according to claim 7, wherein said reception terminal comprises:
a first protection unit provided between the first alarm indication detection unit and the control unit to prevent a noise from being supplied to the control unit when the alarm indication from the first alarm indication detection unit is supplied to the control unit; and
a second protection unit provided between the second alarm indication detection unit and the control unit to prevent a noise from being supplied to the control unit when the alarm indication from the second alarm indication detection unit is supplied to the control unit.

9. The transmission system according to claim 7, wherein said reception terminal comprises:
a first phase-locked loop unit for continuously generating a clock on the working channel line even when the working channel line has failed due to stopping of a clock supplied on the working channel line, so as to allow the first data delay unit to continue to output the second SDH frame which is synchronous with the clock generated by the first phase-locked loop unit; and
a second phase-locked loop unit for continuously generating a clock on the protection channel line even when the protection channel line has failed due to stopping of a clock supplied on the protection channel line, so as to allow the second data delay unit to continue to output the third SDH frame which is synchronous with the clock generated by the second phase-locked loop unit.

10. The transmission system according to claim 7, wherein said reception terminal comprises:
a first alarm determination unit for determining whether the working channel line has failed based on an operating condition of the working channel line, wherein, when the first alarm determination unit determines that the working channel line has failed, the first alarm determination unit supplies a signal indicating occurrence of the failure of the working channel line prior to transmission of the data on the working channel line; and a second alarm determination unit for determining whether the protection channel line has failed based on an operating condition of the protection channel line, wherein, when the second alarm determination unit determines that the protection channel line has failed, the second alarm determination unit supplies a signal indicating occurrence of the failure of the protection channel line prior to transmission of the data on the protection channel line.

\* \* \* \* \*